US012718834B2

(12) United States Patent
Brammer et al.

(10) Patent No.: US 12,718,834 B2
(45) Date of Patent: Aug. 25, 2026

(54) METHOD AND APPARATUS FOR IMPROVING INTELLIGIBILITY OF SPEECH AND AUDIBILITY OF WARNING SOUNDS IN NOISE

(71) Applicant: University of Connecticut, Farmington, CT (US)

(72) Inventors: Anthony John Brammer, Ontario (CA); Insoo Kim, Avon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 222 days.

(21) Appl. No.: 18/770,039

(22) Filed: Jul. 11, 2024

(65) Prior Publication Data

US 2025/0022481 A1 Jan. 16, 2025

Related U.S. Application Data

(60) Provisional application No. 63/512,978, filed on Jul. 11, 2023.

(51) Int. Cl.
*G10L 21/0364* (2013.01)
*G10L 21/0208* (2013.01)

(52) U.S. Cl.
CPC ...... *G10L 21/0364* (2013.01); *G10L 21/0208* (2013.01)

(58) Field of Classification Search
USPC ...................................................... 704/1–504
See application file for complete search history.

(56) References Cited

U.S. PATENT DOCUMENTS 10,728,677 B2 * 7/2020 Pedersen .............. H04R 25/554
12,205,611 B2 * 1/2025 Pedersen ............... G10L 21/057
(Continued)

FOREIGN PATENT DOCUMENTS

JP 2022507834 A * 1/2022 ........... A61B 5/7264

OTHER PUBLICATIONS

Acoustical Society of America; "Method for Measuring the Intelligibility of Speech over Communication Systems"; American National Standards Institute, Inc.; Dec. 9, 2020, 38 pages.
(Continued)

*Primary Examiner* — Marcus T Riley
(74) *Attorney, Agent, or Firm* — CANTOR COLBURN LLP

(57) ABSTRACT

A method for improving intelligibility of speech and/or warning sounds generated in a noisy environment including receiving an audio signal from the noisy environment, segmenting the audio signal into a plurality of frequency bandwidths to provide a plurality of temporal bandwidth limited signals, and providing each temporal bandwidth limited signal to an associated signal path and an associated control path in parallel with the associated signal path. The method also includes filtering the temporal envelope bandwidth signal in each associated control path using a delayless filter to provide an associated control signal, modulating an amplitude of the temporal bandpass signal in each associated signal path using the associated control signal to provide an associated output signal, and combining the associated output signals to provide a combined output signal that improves the intelligibility of the speech and/or warning sounds generated in the noisy environment.

24 Claims, 16 Drawing Sheets

(56) References Cited

U.S. PATENT DOCUMENTS

| | | | | |
|---|---|---|---|---|
| 2005/0111683 A1* | 5/2005 | Chabries | H03G 9/005 | |
| | | | 381/317 | |
| 2019/0182607 A1* | 6/2019 | Pedersen | H04R 25/554 | |
| 2022/0406328 A1* | 12/2022 | Pedersen | H04R 25/505 | |
| 2025/0022481 A1* | 1/2025 | Brammer | G10L 21/0364 | |

OTHER PUBLICATIONS

Anderson et al.; "Effects of Active Noise Reduction in Armor Crew Headsets"; AMP Symposium on "Audio Effectiveness in Aviation"; C-596; Oct. 1996, 6 pages.
Arehart et al.; "Relationship Among Signal Fidelity, Hearing Loss, and Working Memory for Digital Noise Suppression"; Ear and Hearing, vol. 36, No. 5; Sep. 2015, p. 505-516.
Azman et al.; "An evaluation of sound restoration hearing protection devices and audibility issues in mining"; Noise Control Eng. 59 (6); Nov. 2011, pp. 622-630.
Cardosi et al.; "Pilot-Controlled Communication Errors: An Analysis of Aviation Safety Reporting System (ASRS) Reports"; US Dept. of Transportation, Research and Special Programs Admin.; Aug. 1998, 40 pages.
Chung et al.; "Modulation-Based Digital Noise Reduction for Application to Hearing Protectors to Reduce Noise and Maintain Intelligibility"; Human Factors The Journal of the Human Factors and Ergonomics Society; vol. 51, No. 1; Feb. 2009, pp. 78-89.
Glasberg et al.; "Derivation of auditory filter shapes from notched-noise data"; Hearing Research; 47; Feb. 1990, pp. 103-138.
House et al.; "Articulation-Testing Methods: Consonantal Differentiation with a Closed-Response Set"; J. Aoust. Soc. Am. 37; Jan. 1, 1965, pp. 158-166.
Kim et al. ; "An algorithm that improves speech intelligibility in noise for normal-hearing listeners"; J. Acoust. Soc. Am. 126; Sep. 9, 2009, pp. 1486-1494.
Lezzoum et al.; "Noise reduction of speech signals using time-varying and multi-band adaptive gain control for smart digital hearing protectors"; Applied Acoustics; 109; Aug. 2016, pp. 37-38.
Li et al.; "Factors influencing intelligibility of ideal binary-masked speech: Implications for noise reduction"; J. Acoust. Soc. Am. 123; Mar. 1, 2008, pp. 1673-1682.
Warren et al.; "Spectral redundancy: Intelligibility of sentences heard through narrow spectral slits"; Perception and Psychophysics; 57(2); Jan. 1995, pp. 175-182.
Wojcicki et al.; "Channel selection in the modulation domain for improved speech intelligibility in noise"; J. Acoust. Soc. Am. 131; Apr. 12, 2012, pp. 2904-2913.

* cited by examiner

METHOD AND APPARATUS FOR IMPROVING INTELLIGIBILITY OF SPEECH AND AUDIBILITY OF WARNING SOUNDS IN NOISE

CROSS REFERENCE TO RELATED APPLICATIONS

This application claims the priority benefit of U.S. Provisional Application No. 63/512,978, filed on Jul. 11, 2023, the entire contents of which are incorporated herein by reference.

STATEMENT OF GOVERNMENT SUPPORT

This invention was made with government support under R21 OH011552 awarded by the Centers for Disease Control and Prevention. The government has certain rights in the invention.

FIELD OF THE INVENTION

The present invention relates to methods and apparatuses for improving the intelligibility of speech and audibility of warning sounds in a noise background. More particularly, the present invention enhances the speech and warning sounds with respect to the background noise to make the speech and warning sounds intelligible.

BACKGROUND

There are many situations in which speech or warning sounds, such as a vehicle back-up alarm or electric vehicle alarm, are rendered unrecognizable or inaudible when the sounds are produced in a noisy environment. Thus, a listener hears a mixture of noise and the communication sounds irrespective of whether they are listening in a different quiet environment (e.g., wearing hearing protectors) or the same noisy environment (e.g., wearing hearing aids).

There are algorithms for so-called "noise reduction" available for hearing aids and other electronic devices. These methods commonly improve speech quality but, in most situations, produce little or no benefit to speech intelligibility. Conventional active noise control is generally beneficial when the speech or warning sounds are produced in a quiet environment and the listener is in a noisy environment. However, the conventional active noise control is not beneficial when the speech or warning sounds are produced in a noisy background environment. Hence, it would be appreciated in the audio industry if methods and apparatus were developed to make speech and warning sounds, which are generated in a noisy environment, intelligible.

BRIEF SUMMARY

Disclosed is a method for improving intelligibility of speech and/or warning sounds generated in a noisy environment. The method includes: receiving an audio signal from the noisy environment; segmenting the audio signal into a plurality of frequency bandwidths to provide a plurality of subband signals; providing each subband signal to an associated signal path and an associated control path in parallel with the associated signal path; filtering a temporal envelope of the subband signal in each associated control path using a delayless filter to provide a filtered control signal; modulating an amplitude of the subband signal in each associated signal path using the filtered control signal to provide a modulated signal for each signal path; combining the modulated signals for each signal path to provide a combined output signal; and converting the combined output signal into an acoustic signal that improves the intelligibility of the speech and/or warning sounds generated in the noisy environment; wherein the segmenting, filtering, modulating, and combining are performed in the time domain.

Also disclosed is an apparatus for improving intelligibility of speech and/or warning sounds generated in a noisy environment. The apparatus includes: a plurality of bandwidth filters configured to segment an audio signal into a plurality of frequency bandwidths to provide a plurality of subband signals; a signal path and a control path in parallel with the control path for each subband signal to receive the associated subband signal; a delayless filter disposed in each control path to filter a temporal envelope of the associated subband signal in the control path to provide a filtered control signal; a modulation node in communication with each signal path and control path pair and configured to modulate the subband signal in the signal path with the filtered control signal in the control path to provide a modulated signal for each subband; and a summing node configured to sum the modulated signals to provide a combined output signal; and an acoustic transducer that receives the combined output signal and converts the combined output signal into an acoustic signal that improves the intelligibility of the speech and/or warning sounds generated in the noisy environment; wherein the apparatus performs all signal processing in the time domain.

Further disclosed is a non-transient computer-readable medium comprising instructions for implementing a method. The method includes receiving an audio signal from the noisy environment; segmenting the audio signal into a plurality of frequency bandwidths to provide a plurality of subband signals; providing each subband signal to an associated signal path and an associated control path in parallel with the associated signal path; filtering a temporal envelope of the subband signal in each associated control path using a delayless filter to provide a filtered control signal; modulating an amplitude of the subband signal in each associated signal path using the filtered control signal to provide a modulated signal for each signal path; and combining the modulated signals for each signal path to provide a combined output signal that improves the intelligibility of the speech and/or warning sounds generated in the noisy environment; wherein the segmenting, filtering, modulating, and combining are performed in the time domain.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method is presented herein by way of exemplification and not limitation with reference to the figures.

Disclosed are embodiments of methods and apparatuses for improving the intelligibility of speech and audibility of warning sounds heard in a background of noise, which may also be referred to as a noisy environment. Temporal (i.e., time varying) Amplitude Modulation (TAM) in the time domain is used to increase the signal-to-noise ratio (SNR) of a temporal envelope of the received sound in the noisy environment by identifying and reducing noise from speech and/or warning sounds in the temporal modulation. In general, signals with a frequency less than 2 Hz in temporal modulation can be considered noise. Most linguistic information in the temporal modulation of speech in noise occurs in the frequency range of about 2 to 16 Hz. For quasi-continuous noise sources, the temporal envelopes of the noise form a low frequency trend in the temporal modulation processing. Therefore, removing this trend from the temporal envelope can improve the SNR of temporal envelope of noisy speech. Thus, a delayless high-pass filter implemented by a moving detrend (MD) filter is used that removes the low frequency component (below 2 Hz) in the temporal modulation to remove such noise without distorting linguistic information. The term "delayless" relates to a very fast filter that aids in providing for lip synchronization of the processed sound. The term "improving the intelligibility" (and the like) generally refers to removing noise, which is inclusive of extraneous sounds, from an acoustic data signal where the noise interferes with the understanding of data of interest contained in the acoustic data signal. Non-limiting embodiments of the data of interest include speech, warning sounds, or other sounds of interest.

Figure 1:
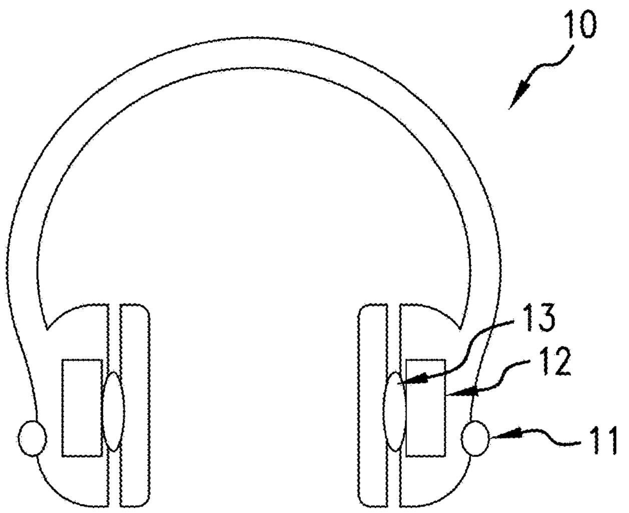
FIG. 1 illustrates an electronic hearing device.

FIG. 1 illustrates an electronic hearing device 10. Various non-limiting embodiments of the electronic hearing device 10 include hearing protectors, headphones and headsets, hearing aids, two-way radios, and mobile phones. The electronic hearing device 10 includes a microphone 11, an audio processor 12, and a speaker 13. The electronic hearing device 10 also includes a body 14 for holding the microphone 11 and the audio processor 12 in addition to holding the speaker 13 adjacent to or in proximity to an ear for hearing sound emitted by the speaker 13. The microphone 11 is configured to convert sounds heard in the noisy environment to an electrical audio signal for processing. The audio processor 12 is configured to use digital signal processing to process the electrical audio signal in the time domain to make the speech and/or warning sounds received in the noisy environment intelligible. The speaker 13 is held in proximity to an ear of a user by the body 14 and is configured to convert a signal processed by the audio processor 12 into output sound heard by the user of the electronic hearing device 10 where speech and or warning sounds are intelligible to the user.

Figure 2:
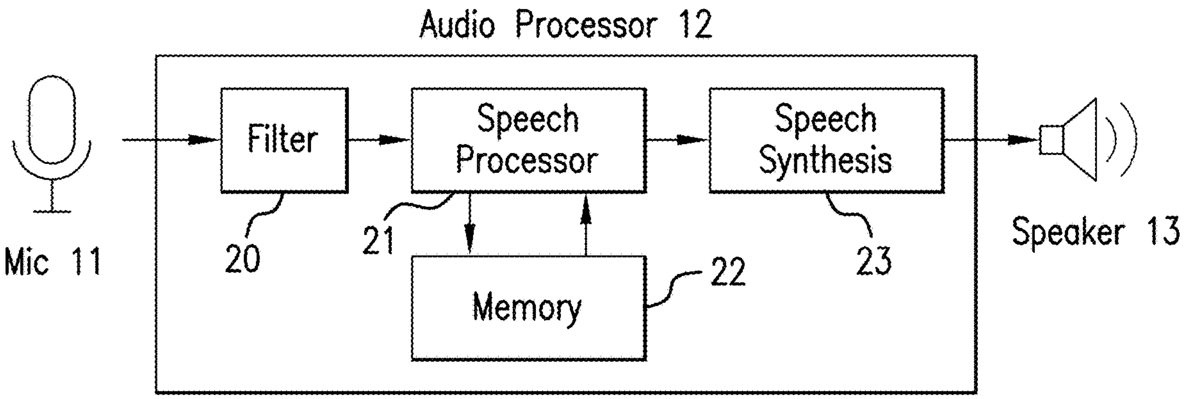
FIG. 2 depicts aspects of an audio processor disposed in the electronic hearing device.

FIG. 2 depicts aspects of the audio processor 12 disposed in the electronic hearing device 10. The audio processor 12 includes a filter 20 configured to provide various filtering capabilities, which are described below in more detail. The audio processor 12 also includes a speech processor 21 that interacts with memory 22 to increase the SNR of the speech and/or warning sounds in the sounds in the noisy environment received by the microphone 11. The audio processor 12 further includes a speech synthesis module 23 configured to receive processed sound data having increased speech and/or warning sound SNR from the speech processor 21 and to synthesize that data, i.e., convert that data to an electrical signal, which can be played by the speaker 13. In general, digital signal processing (DSP) implemented by the audio processor 12 is used to process the sound received by the microphone 11. However, the disclosure is not limited to DSP and analog circuits may be used to implement certain processing functions in some embodiments.

Figure 3:
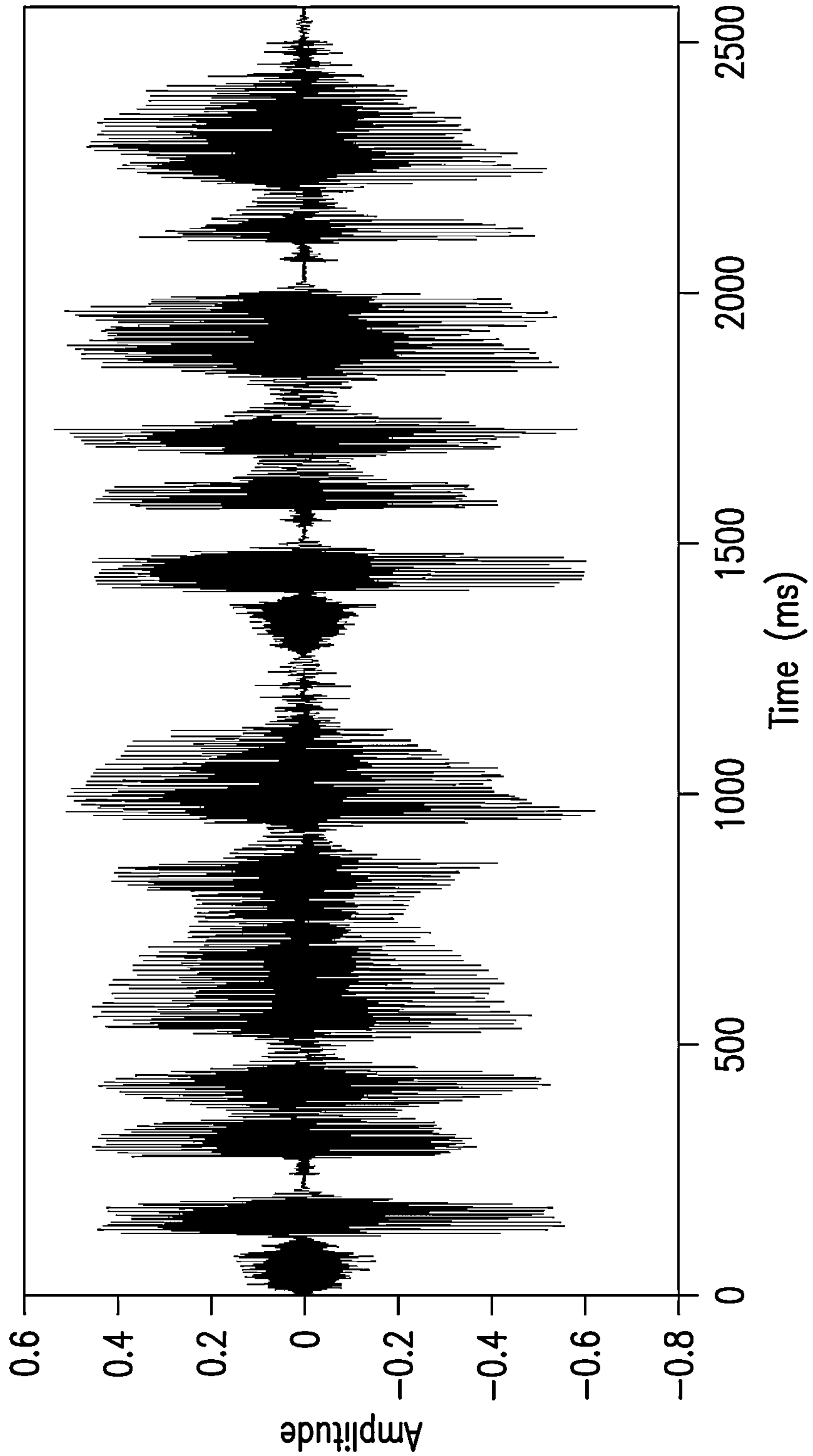
FIG. 3 depicts aspects of a sound pressure waveform of a segment of repeated speech from a speech test with no noise.
Figure 4:
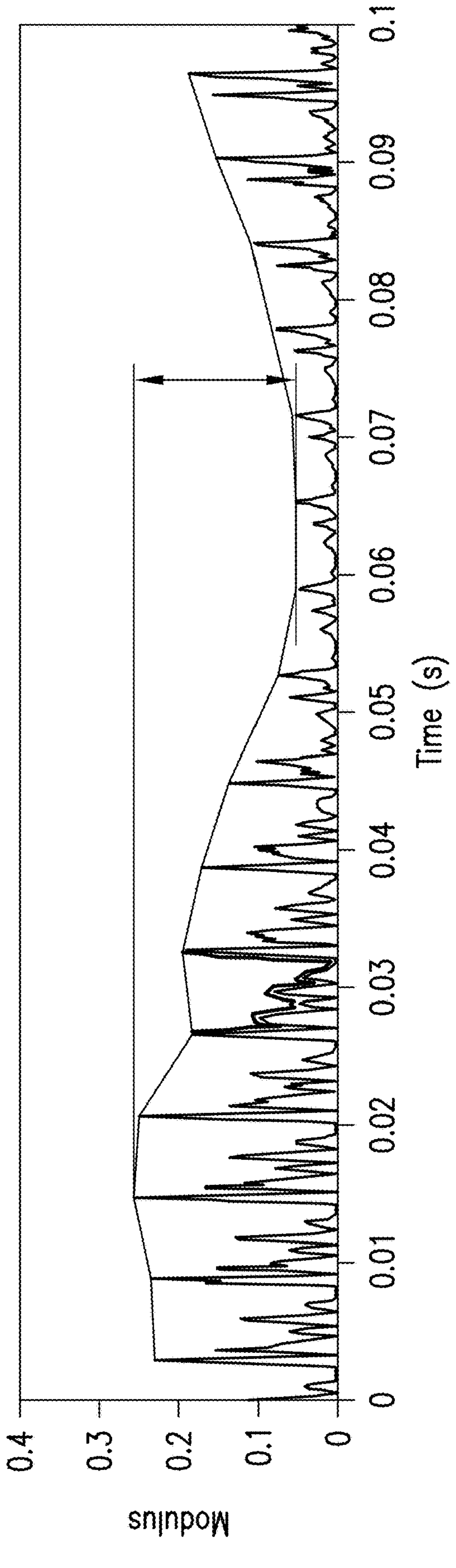
FIG. 4 depicts aspects of an example of a low-frequency envelope of a sound pressure waveform and part of a high-frequency envelope of a modulus of a speech signal as a function of time.

FIG. 3 illustrates a sound pressure waveform (time history, or time domain signal) of a short segment of repeated speech. There is no noise. The similarity between the signal in the first 500 milliseconds (ms) and from 1250-1750 ms, as well as around 1000 ms and 2300 ms, is apparent and results from the same words being spoken. Equally visible are the differences when a different test word is inserted in the middle of the phrase (i.e., from 500 to 700 ms versus from 1800 to 2000 ms). The methods disclosed herein improve the intelligibility of speech and/or the audibility of warning sounds and involve establishing and manipulating signal envelopes to control these sounds. In other words, the changes in amplitude of signals with time are focused upon, as might be seen by an observer looking at FIG. 3. This is done by establishing the modulus of the time history of the signal. The process converts the normal bipolar time history of speech into a unipolar signal such as the base curve in the example shown in FIG. 4 (the curve forming a series of "mountain peaks" and "valleys"). An envelope of this unipolar signal is shown by the upper curve connecting the peaks, with instantaneous peak-to-peak magnitude indicated by the vertical line to the right. In this example, the time history of the envelope, which is often termed the modulation, follows the changes in components of the base signal with the largest magnitudes. This is equivalent to selecting the low-frequency components of the original signal. Other envelopes could be drawn that include the more rapidly changing components of the base signal, that is, the high-frequency components as well as the low-frequency components. This is shown by the highlighted curve centered at about 0.03 seconds in FIG. 4, which continues for the whole time history but has only been drawn between two adjacent large-magnitude peaks. Thus, it is evident that the time history of the modulus (the base curve) will contain fluctuations with different frequencies and different magnitudes.

It is observed that the frequency spectrum of the envelope fluctuations is distinctly different for speech, intermittent tonal warning sounds (e.g., vehicle back-up alarm) and environmental noises. These differences are detected and exploited by the methods and algorithms disclosed herein.

Figure 5:
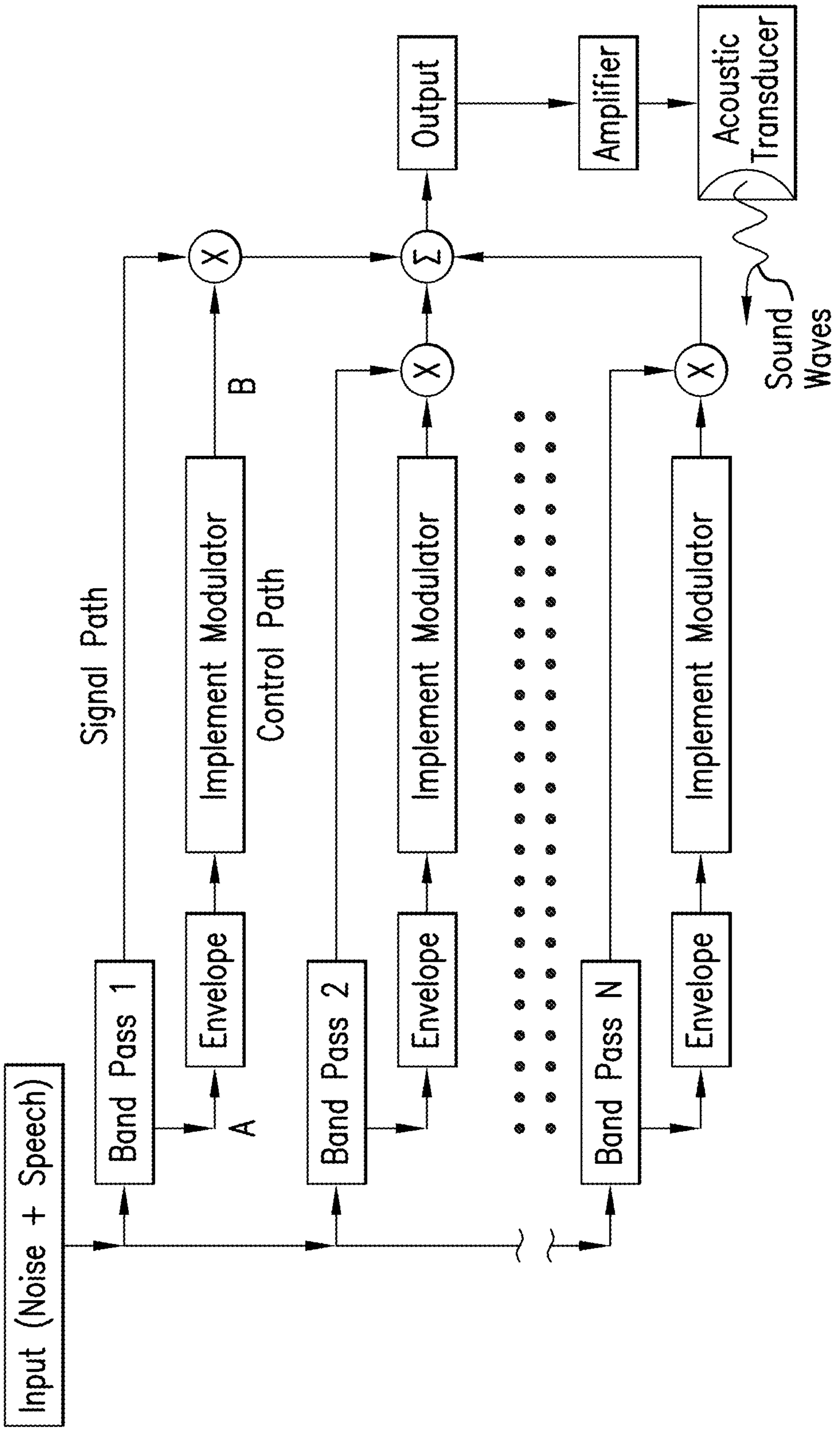
FIG. 5 depicts aspects of a block diagram for an overall concept of algorithms having N subbands of a frequency band.

The basic construction of all the disclosed algorithms is shown in FIG. 5. The input to the algorithm, identified as speech buried in environmental noise but could equally be a warning sound buried in noise, is shown to the left of the diagram. The first step involves a set of N band-pass filters arranged in parallel. N in one or more embodiments is sixteen or greater. These create N subbands that together span the frequency range in which improvements in intelligibility and audibility are desired. In one or more embodiments, the N subbands together may span the frequency range in which speech and warning sounds occur. Thus, each subband contains different carrier frequencies and their associated modulations.

Within each subband there is a signal path and a control path, as identified in FIG. 5 for subband #1. The signal path contains the components of speech (or warning sound) buried in environmental noise with frequencies that fall within the range of the corresponding band-pass filter and would look like the waveform in FIG. 3 in the absence of noise. The envelope of this signal is constructed in the manner already described (see FIG. 4) and feeds the control path. Within the control path is the signal processing that manipulates the envelope to construct the modulation to be applied to the signal path. The control path is identified as from A to B for subband #1 in FIG. 5. Amplitude modulation of the speech (or warning sounds) plus environmental noise in the signal path by this processed envelope is shown by the "X" in FIG. 5. Linear, non-linear and binary modulation are all options for controlling the sounds in the signal path. It can be appreciated that processing for each subband can be performed concurrently to increase the processing speed in total.

Equivalent control paths are constructed for each subband (e.g., as shown from A to B for subband #1 in FIG. 5). While the treatment of the envelope in the modulators is generally the same for each subband, the details can depend on the signal frequency. Finally, the outputs of all subbands are combined (shown by Σ in the diagram), and the reconstructed speech (or warning sounds) in environmental noise can be reproduced for a listener.

There are a large number of variations in signal processing that may be applied to the envelope in the modulator. The algorithms described herein are for the control paths of each subband (i.e., from A to B for subband #1 in FIG. 5). All are designed to: 1) be computationally simple and introduce minimal time delays, 2) enable processing in multiple, parallel subbands to be completed in real-time, 3) be applicable to stand-alone wearables with limited on-board computational resources, and 4) enable synchronization between sound (speech) and a visual image to be maintained (e.g., as in face-to-face communication or video signal processing—often called lip synchronization, or "lip sync"), which typically requires total time delays in the signal path to be no more than 10-60 ms depending on the application. One or more applications of the disclosed signal processing is to enable synchronization between sound (speech) and a visual image to be maintained (e.g., as in face-to-face communication when wearing ear coverings or in video signal processing-often called lip synchronization, or "lip sync"), which typically requires total time delays in the signal path to be no more than 60 ms. However, in certain applications 60 ms represents an unacceptably long time delay and must be reduced. For example, a maximum group delay (i.e., the time delay from the input to the output) of about 10 ms is considered necessary for hearing aids designed for use with unoccluded ears—that is, miniature devices that typically fit above or behind the ear with the amplified sound produced within the open (i.e., unobstructed) ear canal. In these devices, the sounds produced by the disclosed algorithms add to the sounds naturally reaching the ear. In these circumstances, it is often considered preferable for the algorithm to only process sounds within a limited frequency range. A non-limiting example would be to process frequencies from 1 kHz to 6 kHz.

Figure 6:
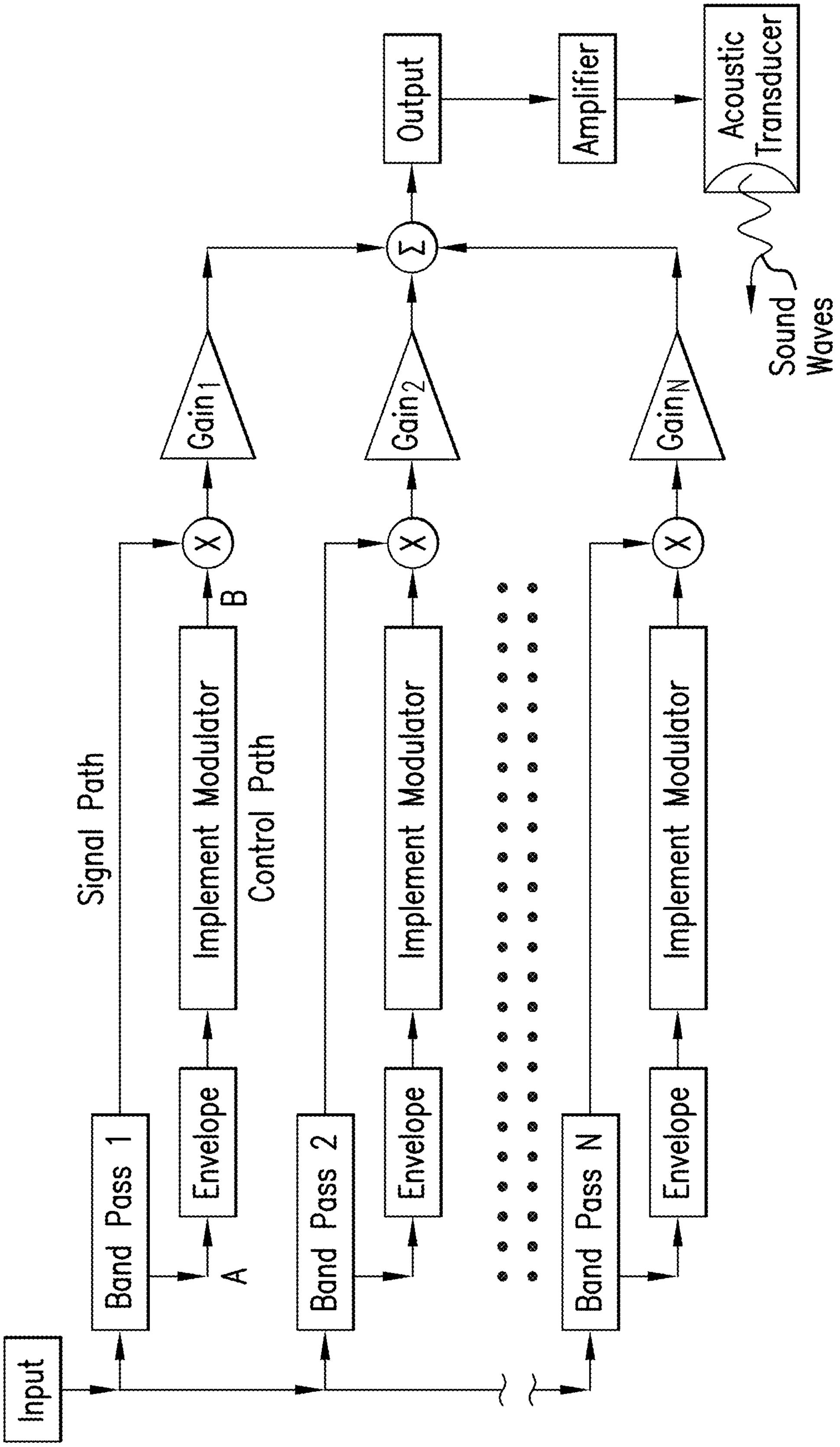
FIG. 6 depicts aspects of a block diagram for the overall concept of algorithms having N subbands of a frequency band and with each subband having an associated gain block.

As noted above, it may be preferrable to process sounds within a limited frequency range. Similarly, it may be preferrable to process sounds with separate amplification of the modulated signal in individual subbands, where the amplification gain may be different in different subbands. This enables the disclosed algorithms to compensate for deficiencies in hearing acuity, which are commonly frequency dependent. Architecture for implementing this technique is illustrated in FIG. 6. Individual gain blocks (i.e., $Gain_1$, $Gain_2$, . . . $Gain_N$) provide separate amplification gain of the modulated signal in the individual subbands.

FIRST EXAMPLE

Figure 7:
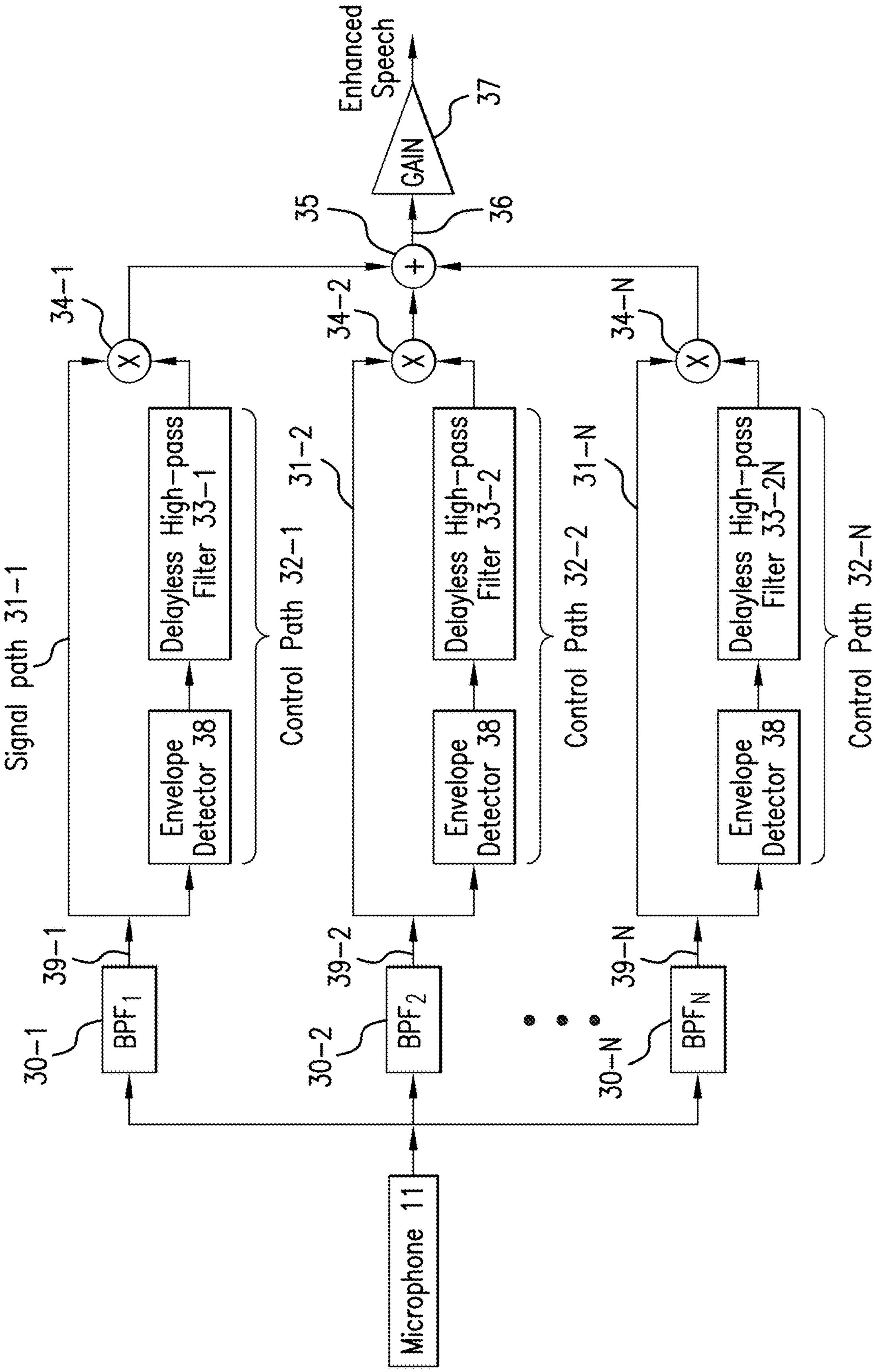
FIG. 7 depicts aspects of a plurality of bandpass filters to segment a received electrical audio signal into a plurality of bandpass signals that are each processed in a control path having a delayless high-pass filter parallel to a signal path.

FIG. 7 depicts aspects of a plurality of bandpass filters to segment a received electrical audio signal into a plurality of bandpass signals that are processed in a control path parallel to a signal path. Sounds in the noisy environment that are picked up by the microphone 11 are provided to a plurality of bandpass filters 30-1 through 30-N. Each bandpass filter 30 passes frequencies in a selected bandwidth while rejecting frequencies outside of the selected bandwidth to provide a temporal (i.e., time varying) signal having frequencies in the passed bandwidth. In general, the bandpass filters 30-1 through 30-N are contiguous bandpass filters that cover a continuous selected range of frequencies. In one or more embodiments, each bandpass signal or segment has a bandwidth that approximates that of an auditory filter at the corresponding frequency.

For teaching purposes, only the signal paths associated with the bandpass filter 30-1 are discussed. The other signal paths associated with the other bandpass filters operate similarly. The bandpass filter 30-1 provides a temporal signal 39-1 to a signal path 31-1 and a control path 32-1. The signal path 31-1 is in parallel with the control path 32-1. The control path 32-1 includes an envelope detector 38, and a delayless high-pass filter 33-1 to reject low frequencies that contain unwanted noise. The resulting temporal envelope signal from the control path 32-1 is used to amplitude modulate the temporal signal in the signal path 31-1 at the multiplication node 34-1, thus increasing the SNR of the speech and/or warning sounds in the signal from the output of the node 34-1. While not illustrated in FIG. 3, the signal path 31-1 and the control path 32-1 may include other processing components used to enhance the speech and/or warning sounds as discussed further below.

The amplitude modulated temporal envelope signals from the multiplication nodes 34-1 through 34-N are combined in a summing node 35 to provide a summed modulated temporal signal 36. A gain 37 is applied to the summed modulated temporal signal 36 to provide an output signal having enhanced speech and/or warning sounds to the speaker 13.

SECOND EXAMPLE

Figure 8:
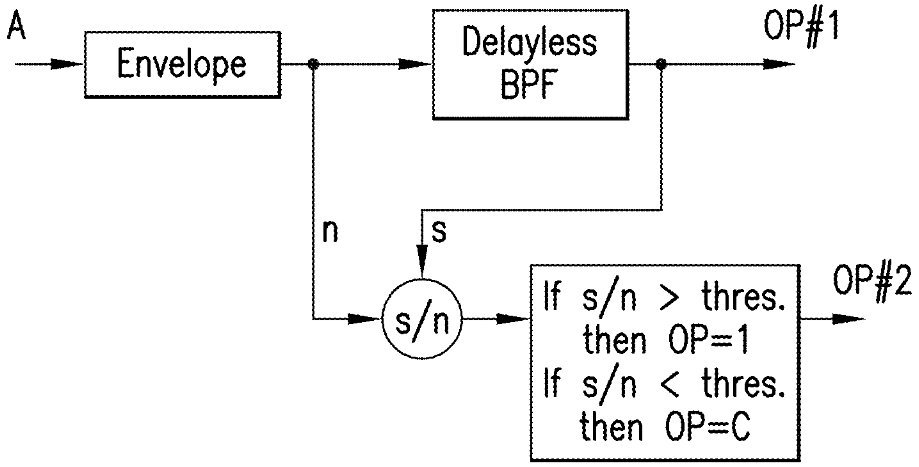
FIG. 8 depicts aspects of a first block diagram for a concept for control path signal processing in one subband for a) linear (or non-linear) amplitude modulation—from A to output #1 (OP #1) and b) for binary modulation—from A to output #2 (OP # 2)

The basic methods for the signal processing in the control path of the disclosed algorithms are shown for one subband in FIG. 8. This signal processing is undertaken from A to B in FIG. 5 for each subband in the time domain. The input to the processing is shown at A in FIG. 8, with either or both of the outputs labeled OP #1 and OP #2 ultimately connected to B. Details of further filtering, gain control, either linear or non-linear, and differences between the processing in different subbands are omitted in order to focus on the overall concepts.

In the simplest configuration, shown at the top of FIG. 8, a band-pass filter that introduces no time delay is implemented (labeled "Delayless BPF"). The cutoff frequencies of this filter are set to the upper and lower modulation frequencies commonly associated with speech (e.g., 2-16 Hz). Warning sounds with modulation frequencies within this range will also be detected (e.g., vehicle backup alarm). The output of this filter is used to amplitude-modulate sounds in the signal path by connecting OP #1 to B in FIG. 3. The rest of the block diagram in FIG. 8 is not needed for this implementation.

Binary modulation requires the construction of a so-called binary mask. The aim of any binary mask is to determine whether the sounds in the signal path contain at a particular time mostly sounds desired to be heard (i.e., speech or warning sounds) or mostly noise. This is done by estimating a "signal-to-noise ratio" as shown in the rest of the block diagram in FIG. 8 and labeled "s/n". By introducing a threshold value for s/n, it is possible to segregate the sounds in the signal path into times when speech (or warning) sounds dominate (i.e., s/n is greater than the threshold value), and times when noise dominates (i.e., s/n is less than the threshold value). The mask is then implemented by connecting OP #2 to B hence multiplying the signal path by unity when s/n is greater than the threshold and a value near zero ("C") when s/n is less than the threshold. Note that OP #1 is not used in this implementation. In this way, time segments of speech (or warning) sounds in noise in the signal path are either passed unchanged through a subband to be summed with the outputs of other subbands (shown by the "Σ" in FIG. 5), or effectively eliminated. Unfortunately, as the sounds inputted to the device and algorithm desired to be heard are always mixed with unwanted noise (e.g., see FIG. 5), neither the signal described as the "speech" (or "warning") sounds, s, nor that described as "noise", n, contain solely either desired sounds (in s) or the undesired sounds (in n). For this reason, the ratio s/n is called the magnitude ratio (MR) rather than a signal-to-noise ratio.

The methods disclosed herein are for implementing filters that introduce nominally "zero" (or extremely short) time delays and of methods for implementing a binary mask when speech and warning sounds are buried in environmental noise. The former are needed to implement linear and non-linear amplitude modulation (i.e., from A to OP #1 in FIG. 8), and both delayless filters and a binary mask are needed to implement binary masking (i.e., from A to OP #2 in FIG. 8). Delayless filters enable the modulations imposed on the speech (or warning sounds) to occur at the time when they may be expected to have the most possibility to improve intelligibility (for speech) and audibility (for warning sounds).

Figure 9A:
FIGS. 9*a*-9*c* depict aspects of delayless filters constructed using moving detrend (MD) operations for (a) a high-pass filter; (b) a low-pass filter, and (c) a band-pass filter.
Figure 9B:
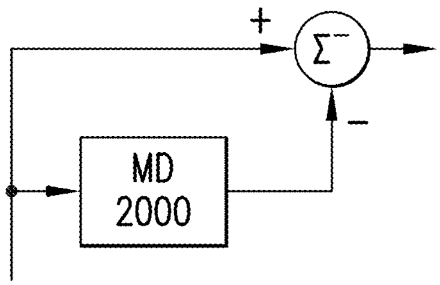
Figure 9C:
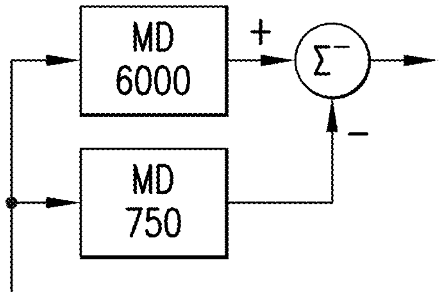

Delayless high-pass, low-pass and band-pass filters (abbreviated here to HPF, LPF and BPF) have been implemented using moving detrend operations, MD xxxx, where xxxx specifies the number of samples included in calculating the short-term mean value that describes the "trend" of the time history. Examples of high-pass, low-pass and band-pass filters constructed in this way are shown schematically in FIGS. 9*a*-9*c*. FIG. 9*a* illustrates an implementation of a high-pass filter; FIG. 9*b* illustrates an implementation of a low-pass filter, and FIG. 9*c* illustrates an implementation of a band-pass filter. When the sampling frequency is 12 kHz, the cutoff frequencies are: 2 Hz for FIG. 9*a;* 6 Hz for FIG. 9*b*; and the passband is from 2 to 16 Hz for FIG. 9*c*. Combinations of delayless HPFs and conventional delay LPFs have been constructed to implement both linear and binary amplitude modulation processing and it was confirmed that they improve speech intelligibility in noise using a standardized listening test-the Modified Rhyme Test (MRT). All implementations disclosed herein involve subbands of different bandwidths in order to be compatible with the bandwidth of auditory filters in the cochlea at different frequencies. This does not affect linear amplitude modulation processing (i.e., from A to OP #1 in FIG. 4) but does affect binary modulation processing, as the different bandwidths may require a different threshold to optimize the MR of each subband. Such thresholds are difficult if not impossible to obtain by listening tests in a system consisting of sixteen or more subbands. In these circumstances, thresholds for individual subbands are preset by measurement of s/n and not by listening tests.

Figure 10:
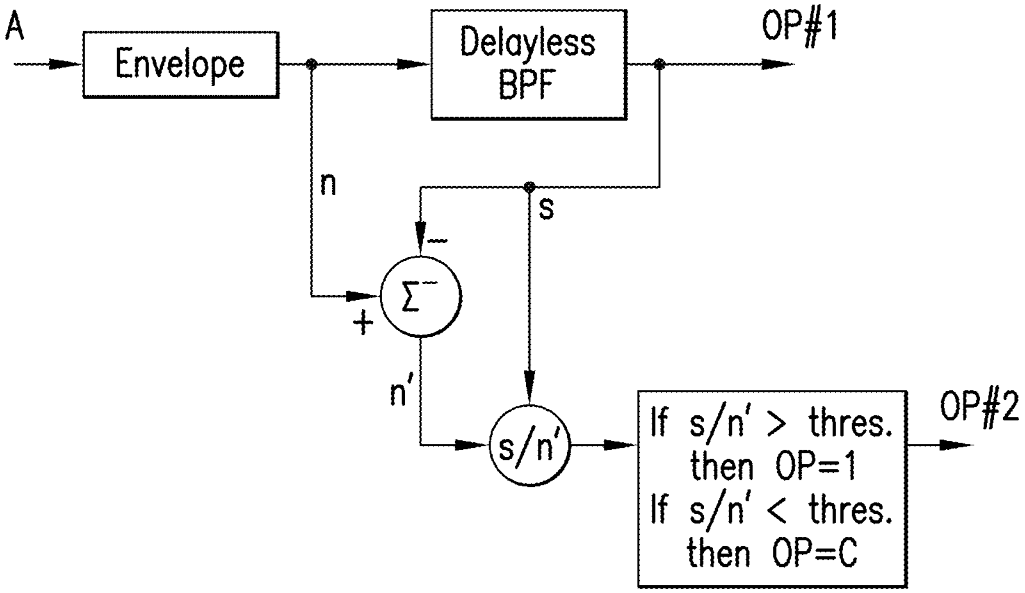
FIG. 10 depicts aspects of a second block diagram for a concept for control path signal processing in one subband for a) linear (or non-linear) amplitude modulation—from A to OP #1 and b) for binary modulation—from A to OP #2.

One method for improving the estimate of MR from that shown in the simplest concept is to remove the sounds at modulation frequencies associated with speech from the noise, as shown in the block diagram of FIG. 10. Here, the output of the delayless BPF is subtracted from the envelope of all sounds in the subband, n, to form a signal with the modulation frequencies associated with speech removed, n' (=n−s). FIG. 10 illustrates a conceptual block diagram for control path signal processing in one subband for: a) linear (or non-linear) amplitude modulation—from A (shown also in FIG. 5) to output #1, OP #1, and b) for binary modulation—from A to OP #2. The ratio of sounds with speech frequency modulations, s, and environmental noise excluding speech frequency modulations, n', is formed, i.e., s/n'. A binary output of unity or "C" is obtained depending on whether or not s/n' exceeds a preset threshold (thres.). "C"

is commonly near zero. Output OP #1 or OP #2 is connected to B in FIG. 5, for linear and binary modulation, respectively. Both outputs are used for combined linear and binary modulations. BPF represents band-pass filter in FIG. 10. While this operation will remove most speech sounds from the "noise", it will produce a modulation spectrum deficient in the modulation frequencies associated with speech. It will also not resolve the problem of identifying appropriate thresholds for the ratio s/n' when each subband has a different bandwidth.

These deficiencies are addressed in the following way. The constant bandwidth modulation spectrum of noise is approximately flat over the range of frequencies within each subband used in the algorithms disclosed herein. This results from the subband bandwidths being restricted approximately to the bandwidth of auditory filters in the cochlea.

Figure 11:
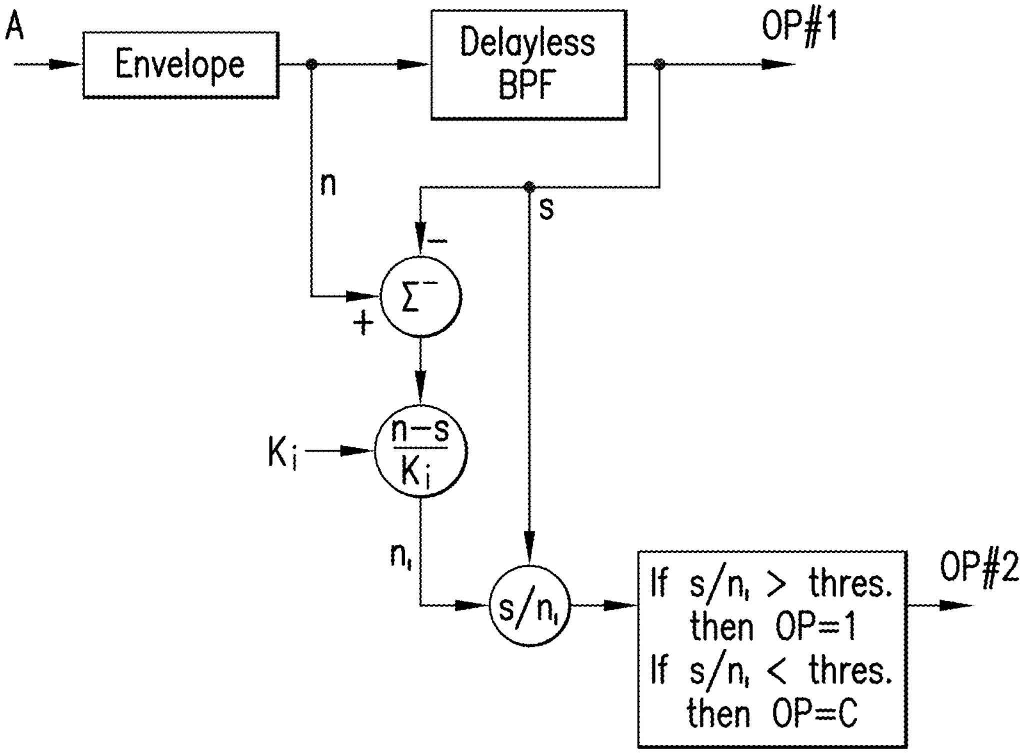
FIG. 11 depicts aspects of a third block diagram for a concept for control path signal processing in one subband for a) linear (or non-linear) amplitude modulation—from A to OP #1 and b) for binary modulation—from A to OP #2.

Hence, the appropriate magnitude of the signal (n−s) to compensate for the removal of s from n is to attenuate (i.e., divide) this signal by Ki, where i=1 to N (N being the number of subbands, as already noted—see FIG. 5). Ki are numerical constants with magnitudes that depend on the bandwidth of the ith subband. (The control path of this algorithm is shown in FIG. 11). FIG. 11 illustrates a concept block diagram for control path signal processing in one subband for: a) linear (or non-linear) amplitude modulation and b) for binary modulation, as before. The ratio of sounds with speech frequency modulations, s, and environmental noise excluding speech frequency modulations, $n_1$, is normalized to the same modulation bandwidth as s by introducing a numerical factor Ki to form $s/n_1$. The Ki will have values that depend on the bandwidth of each subband. In FIG. 11, BPF represents band-pass filter.

The magnitudes of the Ki can be established by inputting pure noise to the device and algorithm (i.e., replace the input signal in FIG. 5 labeled "Input (Noise+speech)" by noise). In these circumstances, the Ki are adjusted so that OP #2→1 in each subband. The magnitudes of the Ki obtained in this way will remain unchanged for the subband bandwidths used in a given implementation.

Figure 12:
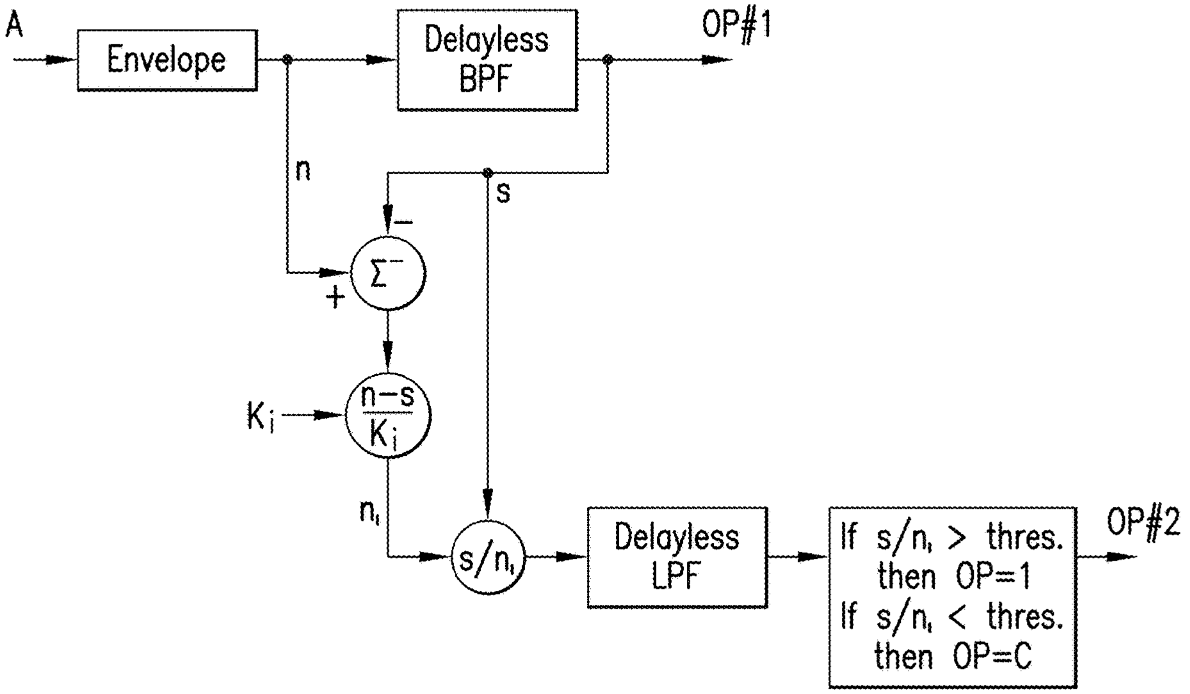
FIG. 12 depicts aspects of a fourth block diagram for a concept for control path signal processing in one subband for a) linear (or non-linear) amplitude modulation—from A to OP #1 and b) for binary modulation—from A to OP #2.

A further modification in the binary modulation algorithm can be made by recognizing that the peak magnitude of the speech modulation spectrum occurs at about 4-5 Hz. Hence, the last speech modulation to be "buried" in the approximately flat noise modulation spectrum as noise intensity increases will be at these modulation frequencies. Also, experience has shown that the modulation ratio (i.e., MR=s/n in FIG. 5, s/n' in FIG. 10, and $s/n_1$ in FIGS. 11 and 12) contains temporal fluctuations that impede the operation of a threshold detector for sounds close to the threshold. Accordingly, steps need to be taken in a practical implementation to smooth the signal reaching the threshold detector. Introducing one or more delayless LPFs with cutoff frequency around 6-8 Hz after calculating the MR will simultaneously address this issue and limit the modulation bandwidth to that known to contain the maximum intensity of speech. A method that employs a single delayless LPF for these purposes is shown in FIG. 12. A further reduction in the effect of fluctuating modulations on the threshold detector is obtained by introducing hysteresis in the detection magnitude, with the magnitude of the MR necessary to change from "C" to unity exceeding that needed to return the detector from unity to "C". Thus, once the detector undergoes a change in state, that state is maintained irrespective of the input MR for a short time in order to additionally reduce the effect of fluctuating modulations. FIG. 12 illustrates a conceptual block diagram for control path signal processing in one subband for: a) linear (or non-linear) amplitude modulation and b) for binary modulation, as before. The ratio of sounds with speech frequency modulations, s, and environmental noise excluding speech frequency modulations, n' is normalized to the same modulation bandwidth as s by introducing a numerical factor Ki, to form $s/n_1$. The Ki will have values that depend on the bandwidth of each subband. The time signal s/n is additionally smoothed by an LPF prior to threshold detection. In FIG. 12, BPF represents band-pass filter and LPF represents low-pass filter.

Moreover, the introduction of delayless LPFs with the same bandwidth into the control path of each subband, as shown for one subband in FIG. 12, will result in the threshold for each subband being identical. An optimum threshold can now be established by adjusting the single, universal threshold in formal listening tests using the MRT. Control algorithms have also been constructed and evaluated in listening tests using the MRT in which conventional LPFs with a cutoff frequency around 6-8 Hz have been placed in the paths of both s and n in the block diagram of FIG. 4 (see Example 2 further below). This simultaneously restricts the calculation of the MR to the most intense speech sounds and reduces higher frequency fluctuations in the MR.

An unwanted consequence of digital signal processing is the unavoidable introduction of uncertainty in some operations that in implementations results in electronic noise. This noise, which is frequently referred to as musical noise, often possesses an unnatural, eerie quality involving multiple tones, each varying in intensity. Reduction of this noise is achieved by low-pass filtering in algorithms employing amplitude modulation. For algorithms employing binary modulation, the range of measures already described for reducing fluctuating modulations perform this function, which is further aided by slowing the rate of change in binary state (i.e., from "C" to unity, and from unity to "C"). In implementations disclosed herein of linear, non-linear and binary modulation methods, some residual environmental noise is allowed to pass through the modulator to the output of the algorithm and device in order to render inaudible the musical noise by masking. It is for this reason that the binary threshold detector does not operate with "C"=0.

Examples of control algorithms developed to implement the methods described herein are shown below. In some cases, appropriate time delays (indicated in block diagrams by $z^{-1}$) have to be introduced into the signal path to compensate for the group (time) delays introduced by some filters that may not be delayless.

EXAMPLE 1

Method for Linear Amplitude Modulation

Figure 13:
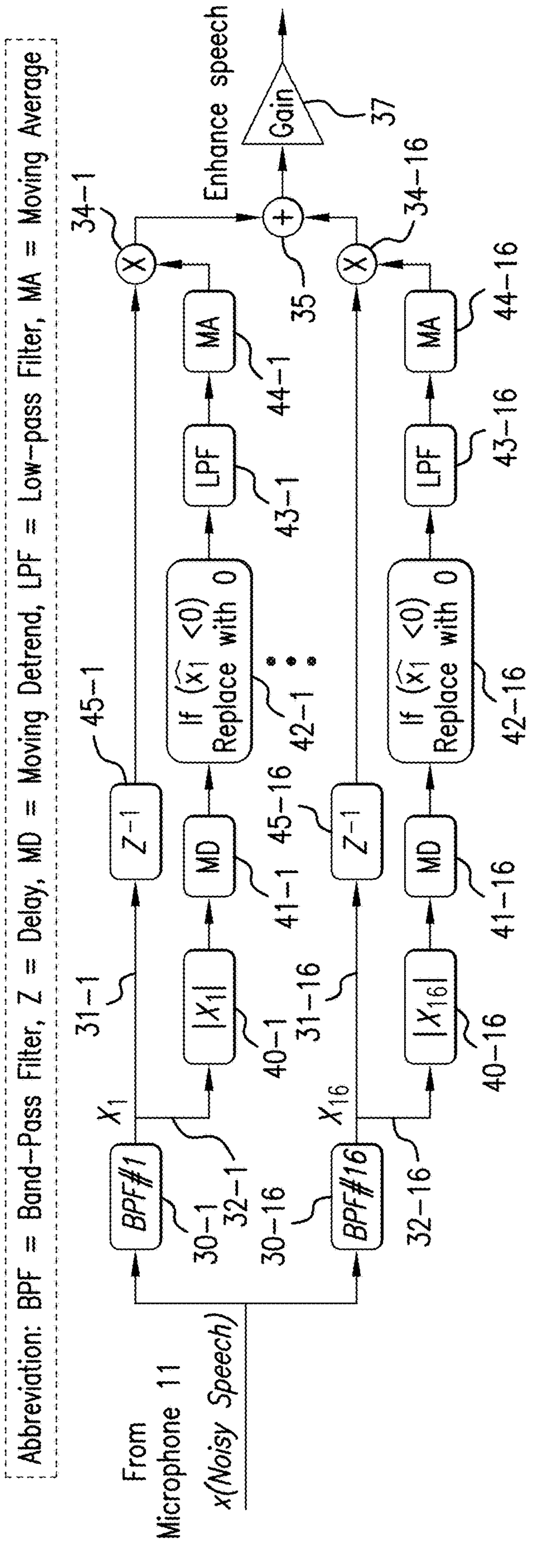
FIG. 13 depicts aspects of an embodiment for an implementation of a linear amplitude modulation method.

FIG. 13 illustrates both the signal path (top) and control path (below) for subbands #1 and #16 of a multiband method employing linear amplitude modulation for improving speech understanding in noise. In each subband, the upper connection from the BPF to the modulator (shown by 'x') is the signal path (31-1 to 31-16) of FIG. 5, and the lower is the control path (32-1 to 32-16). The signal path includes a time delay ($z^{-1}$) (45-1 to 45-16) to compensate for the delays introduced by the conventional LPFs and identifies the time series in the two subbands as X1 and X16. The method shows the implementation of the control path concept for amplitude modulation (from A to OP #1 in FIG. 8). The operation forming the envelope is identified as |X1| and |X16| (40-1 to 40-16). A delayless HPF is implemented by a moving detrend operation (MD). A combination of two LPFs, one a conventional FIR filter (identified as LPF) and the second a short-delay, moving average filter (MA) is used to provide a rapid cutoff at modulation frequencies above those associated with speech, and to reduce musical noise. The three filters together form the BPF in FIG. 8. The MD can result in a negative output from the operation, which has no meaning when processing the envelope of a signal. For this reason, the MD is followed by a conditional statement that replaces negative values with zero. The method has been demonstrated by listening tests to improve speech intelligibility in noise.

The embodiment of FIG. 13 is now discussed in further detail. In the embodiment of FIG. 13, TAM-based speech enhancement algorithms use the temporal envelopes constructed independently in parallel subbands in the frequency-time domain, which provide a time-varying gain for each sampled signal. The signal path 31 and the control path 32 are first discussed without the delayless high-pass filter. The delayless high-pass filter is later introduced to show how the delayless high-pass filter affects the algorithm.

In this algorithm, the noisy speech signal (often referred to as containing the "fine structure), X, is fed to sixteen contiguous band-pass filters (BPF 30-1 to 30-16) to construct sixteen subbands. The subband signals, $X_i$, can be expressed in Eq. (1).

$$X_i = hb_i * x,\ 1 \le i \le 16 \tag{1}$$

where i is the subband number, $hb_i$ is the transfer function of the band-pass filter, and operator * denotes convolution. The temporal modulation signal, $M_i$, in each subband (without the delayless high-pass filter) is constructed by rectifying $X_i$ and subsequent low-pass filtering of this signal as in Eq. (2).

$$M_i = |X_i| * hl,\ 1 \le i \le 16 \tag{2}$$

where i is the subband number and hl shows the transfer function of the low-pass filter implemented as a finite-impulse-response (FIR) filter.

The modulation signal $M_i$ is used to set the dynamic gain for each subband to be multiplied by the corresponding subband input data. The dynamic gain modulates the fine structure of speech presented in each subband, as described in Eq. (3). Before multiplication, a suitable delay ($Z^{-1}$ in Eq. (3)), is imposed on the subband input signal in the signal path 31 to compensate for the group delay of the FIR filter.

$$\hat{X}_i = M_i \times Z^{-1}(X_i),\ 1 \le i \le 16 \tag{3}$$

where i is the subband number and $\hat{X}_i$, is the processed signal in the $i^{th}$ subband. The same procedure is used for all subbands. Finally, the modulated signals for all sixteen subbands are combined to construct the processed speech $\hat{x}$. The output signal passes through a constant gain indicated by the G variable in Eq. (4), to generate a comfortable listening level.

$$\hat{x} = \left[\sum_{i=1}^{16} \hat{X}_i\right] \times G \tag{4}$$

In the embodiment of FIG. 13, this algorithm is constructed using 512-tab finite impulse response (FIR) BPFs. The subbands are approximately 1.5 times the effective bandwidth of an auditory filter in the cochlea and cover the frequency range from 200 Hz to 6 kHz. The low-pass filters (LPFs) are also designed using 512-tab FIR filters. The cutoff frequency of the LPF is set to 12 Hz in this embodiment, considering that most speech-related information occurs below 12 Hz in the modulation domain. If delayless filters are used in the control path, the time delay in the signal path of the algorithms in the provisional patent arises within the band-pass filters used to generate the subbands when these are implemented as finite impulse response (FIR) band-pass filters with 512 taps. It should be noted that the text regarding FIR band-pass filters in Example 1 is specific to Example 1 and should not be construed to generally apply to all the disclosed algorithms. Band-pass filters (BPFs) are used to generate the subbands as shown in the overall concept block diagrams of the algorithms, namely FIGS. 5, 6, and 7. The subband generating filters need not be FIR band-pass filters with 512 taps, as described in the paragraphs of Example 1. Indeed, there is reason for them not to be such filters when the goal is to minimize the time delay in the signal path. Thus, when the band-pass filters used to create subbands must possess minimum time delay, the band-pass filters can be any filter type that satisfies the required group delay including the delayless filters using moving detrend operations shown in FIG. 9*a*-9*c* and discussed further above.

The delayless high-pass filters are now introduced and are implemented by moving detrend (MD) filters 41-1 through 41-N. The algorithm is now modified by adding a zero-replacement block to eliminate negative values in the temporal modulation path to reduce noise modulation and a moving average (MA) filter cascaded with a low-pass filter (LPF) to reduce musical noise.

The MD filter is used to reduce the noise modulation and to improve the SNR of temporal modulation by distinguishing the noise modulation from noisy speech modulation. The MD function is selected to identify the trend signal over a window and then to remove the trend from the original signal. The MD is employed independently for each subband and updated for every new sample. The temporal envelope after the MD ($\dot{M}_i$) can be rewritten by Eq. (5):

$$\dot{M}_i = MD(|X_i|, l_{env}),\ 1 < i < 16 \tag{5}$$

where i is the subband number, MD and $l_{env}$ indicate the moving detrend function and window length, respectively. It should be noted that a MD may produce negative values in the modulation signal, resulting in artificial noise in the output signal. To resolve this problem, the negative values are replaced with zeros as in Eq. (6).

$$\begin{cases} \text{if } (\dot{M}_i < 0), & \dot{M}_i = 0 \\ \text{else} & \dot{M}_i = \dot{M}_i \end{cases} \tag{6}$$

Substituting negative values with zeros generates high-frequency components in the modulation signal. However, components above the cutoff frequencies of the subsequent LPF and MA will be reduced. Therefore, this substitution is unlikely to influence speech intelligibility because peaks in the modulation signal are essential to speech intelligibility but not the troughs.

The window length of the MD filter is chosen realizing that the frequency response of the MD filter is dependent on it. The MD filter acts as a high pass filter and the cut-off frequency varies with the length of signal window. In one or more embodiments, the MD filter is selected with a length of 6000 samples to suppress modulation signals under 2 Hz.

The effect of the MD filter on the temporal envelope in several subbands has been considered. The MD filter reduces the "DC" component of the signal, which is unrelated to speech sounds, and results in improved SNR of the speech modulations in all subbands.

Musical noise relates to unwanted noise generated by the algorithm implemented by the audio processor 12. The main source of musical noise in the temporal modulation algorithm is multiplication of the modulation and the fine structure signals (Eq. (3)). In general, an FIR low-pass filter with a filter order greater than 1536 would be required to provide enough attenuation (around −40 dB) to reduce musical noise substantially. Given the computing resources available on stand-alone wearable audio devices 10, implementing such high-order, low-pass filters in each subband is not a viable solution. To overcome this, an MA filter is cascaded with the LPF to improve the overall filter characteristics without significantly increasing the required computing resources.

The effect of the MA length on the frequency response of a white noise signal is now considered. Three different lengths consisting of 240, 480, and 960 samples have been simulated for a sampling frequency of 12 kHz. To match the cut-off frequency (12 Hz) of the low pass filter, the MA with the length of 480 samples was selected. An MA with length of 960 samples attenuates low frequency components of modulation signal (less than 10 Hz), although it shows better performance in terms of attenuating high frequency signals. Additionally, decreasing the MA length to 120 or 240 does not attenuate sufficiently the high frequency components.

To evaluate the characteristics of the combined filters (cLPF), which include a MA filter (length=480) and 512-tab FIR LPF (cut-off frequency=12 Hz)), the frequency responses of the cLPF are compared with a 512-order FIR LPF and a 480-length MA filter using a white noise input. The cLPF attenuates inputs more than 30 dB with a stop band frequency commencing at 28 Hz (slope of approx. 46 dB/decade), while the FIR LPF attenuates inputs with a slope of approx. 40 dB/decade. Thus, the FIR LPF attenuates inputs only by approximately 12 dB at 30 Hz. Thus, the MA filter produces less attenuation except at frequencies close to 30 and 60 Hz.

Since an MA filter imposes additional delays in the generation of the temporal modulation, the delay should be compensated in the fine structure signal paths (identified by the $X_i$ in FIG. 4) to avoid unnecessary timing mismatches. As an MA filter can be considered an FIR filter with equal coefficients, the delay associated with the MA is equal to half of the MA length. To calculate the temporal modulation signal after cLPF filtering $\hat{M}_i$, the LPF transfer function is considered as in Eq. (2):

$$\ddot{M}_i = \dot{M}_i * hl,\ 1 \le i \le 16 \tag{7}$$

where i is the subband number and hl is the transfer function of the FIR filter. Then, temporal modulation signal after cLPF filtering is defined as Eq. (8):

$$\hat{M}_i = MA\left(\ddot{M}_i, l_{MA}\right),\ 1 \le i \le 16 \tag{8}$$

where i is the subband number, MA and $l_{MA}$ indicate the moving average function and its length, respectively. The enhanced speech ($\hat{x}$) is produced by modulating the input signal $X_i$. Like Eq. (3), a delay operation $Z^{-1}$ is used to compensate for the time delays of the FIR and MA filters. Thus, the output signal of the proposed algorithm is defined as Eq. (9):

$$\hat{x} = \left[\sum_{i=1}^{16} \hat{M}_i \times Z^{-1}(X_i)\right] \times G. \tag{9}$$

Comparing the modulation signals shown in Eq. (7) and Eq. (8) for all subbands at an SNR of −2 dB and a sampling frequency of 12 kHz reveals that the cLPF (with MA with length 480) substantially removes high frequency components so that musical noise is reduced at the output audio signal as compared to not having an MA.

EXAMPLE 2

The first Method for Binary Modulation (and Simultaneous Amplitude and Binary Modulation)

Figure 14:
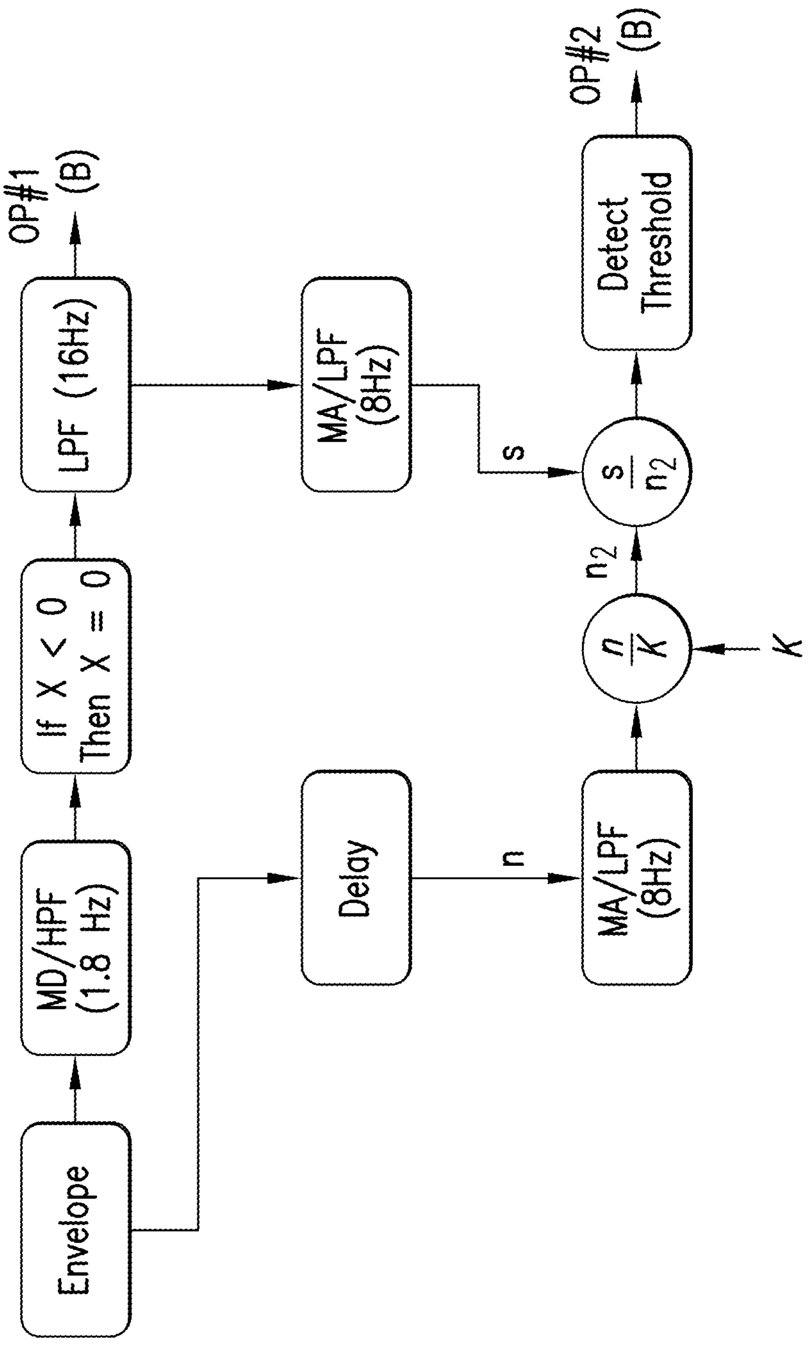
FIG. 14 depicts aspects of a block diagram of a first embodiment for the control path of a single subband for an embodiment of an implementation of a binary amplitude modulation method from A to OP #2 and simultaneous linear and binary amplitude modulation by combining outputs OP #1 and OP #2.

FIG. 14 illustrates the first method for implementing binary modulation. By combining the outputs OP #1 and OP #2, this method also enables simultaneous linear amplitude (OP #1) and binary amplitude (OP #2) modulation to be implemented. Both binary modulation and simultaneous linear and binary modulation have been demonstrated by listening tests to improve speech intelligibility using this method.

This method involves an MD as the delayless HPF with a cutoff frequency of 1.8 Hz, a conventional FIR (finite impulse response) LPF with a cutoff frequency of 16 Hz, and two identical moving average (MA) LPFs each with a cutoff frequency of 8 Hz. A time delay is needed for the noise signal path (n) to compensate for the inherent time delays introduced by the conventional 16-Hz cutoff LPF. This method is an implementation of the control path concepts for binary amplitude modulation (from A to OP #2 in FIG. 8) as well as for linear amplitude modulation (from A to OP #1 in FIG. 8). In FIG. 14, MA/LPF is a moving average (MA) short delay low pass filter (LPF).

EXAMPLE 3

Fully Delayless Implementation of Linear Amplitude And Binary Modulation

Figure 15:
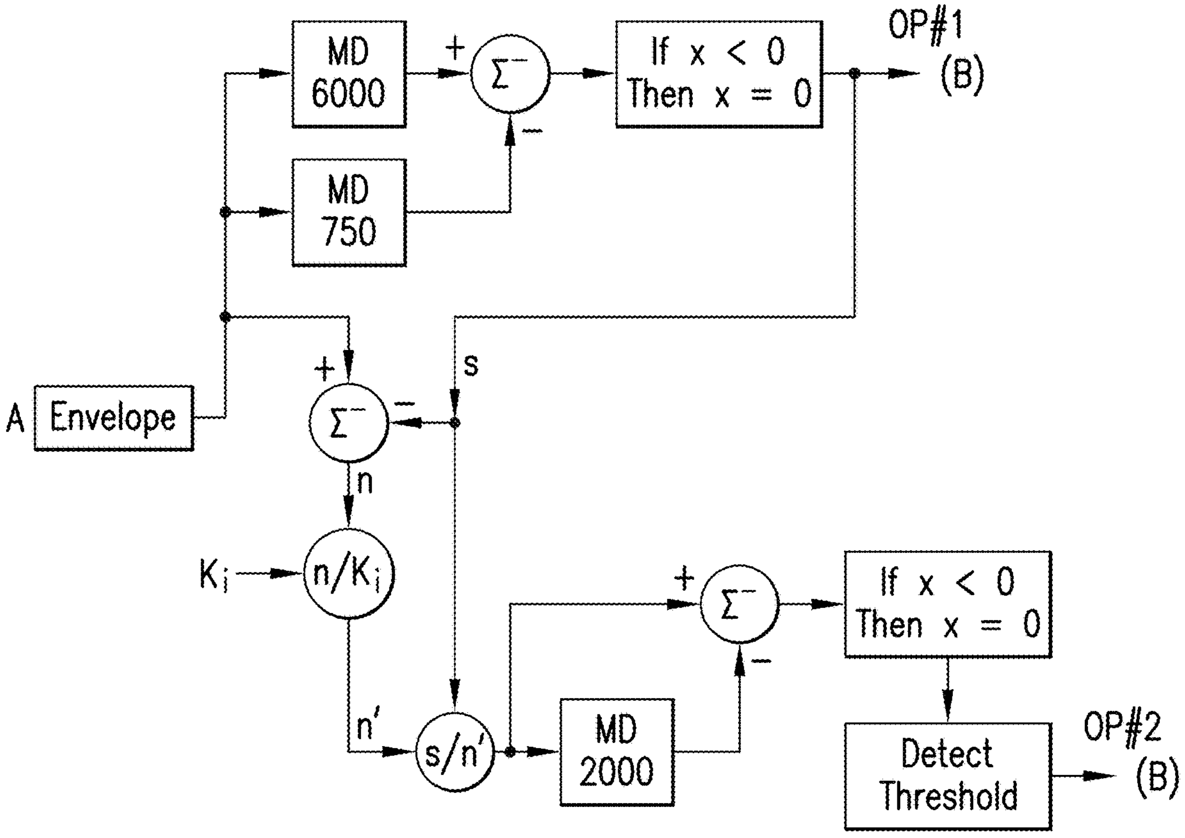
FIG. 15 depicts aspects of a block diagram of a second embodiment for the control path of a single subband for a fully delayless implementation of a binary amplitude modulation method from A to OP #2 and simultaneous linear and binary amplitude modulation by combining outputs OP #1 and OP #2.

Fully delayless implementation of linear amplitude and binary amplitude modulation is achieved by the method illustrated in the block diagram of FIG. 15. The lengths of the moving detrends (MDs) produce filter cutoff frequencies of approximately 2 Hz (6000), 6 Hz (2000), and 16 Hz (750) when a data sampling frequency of 12 kHz is employed. The method is an implementation of the control path concepts for binary amplitude modulation (from A to OP #2 in FIG. 11) as well as for linear amplitude modulation (from A to OP #1 in FIG. 12). It has been shown to improve the detection of speech buried in noise, as evidenced by the resolution of the magnitude ratio (MR).

Figure 16:
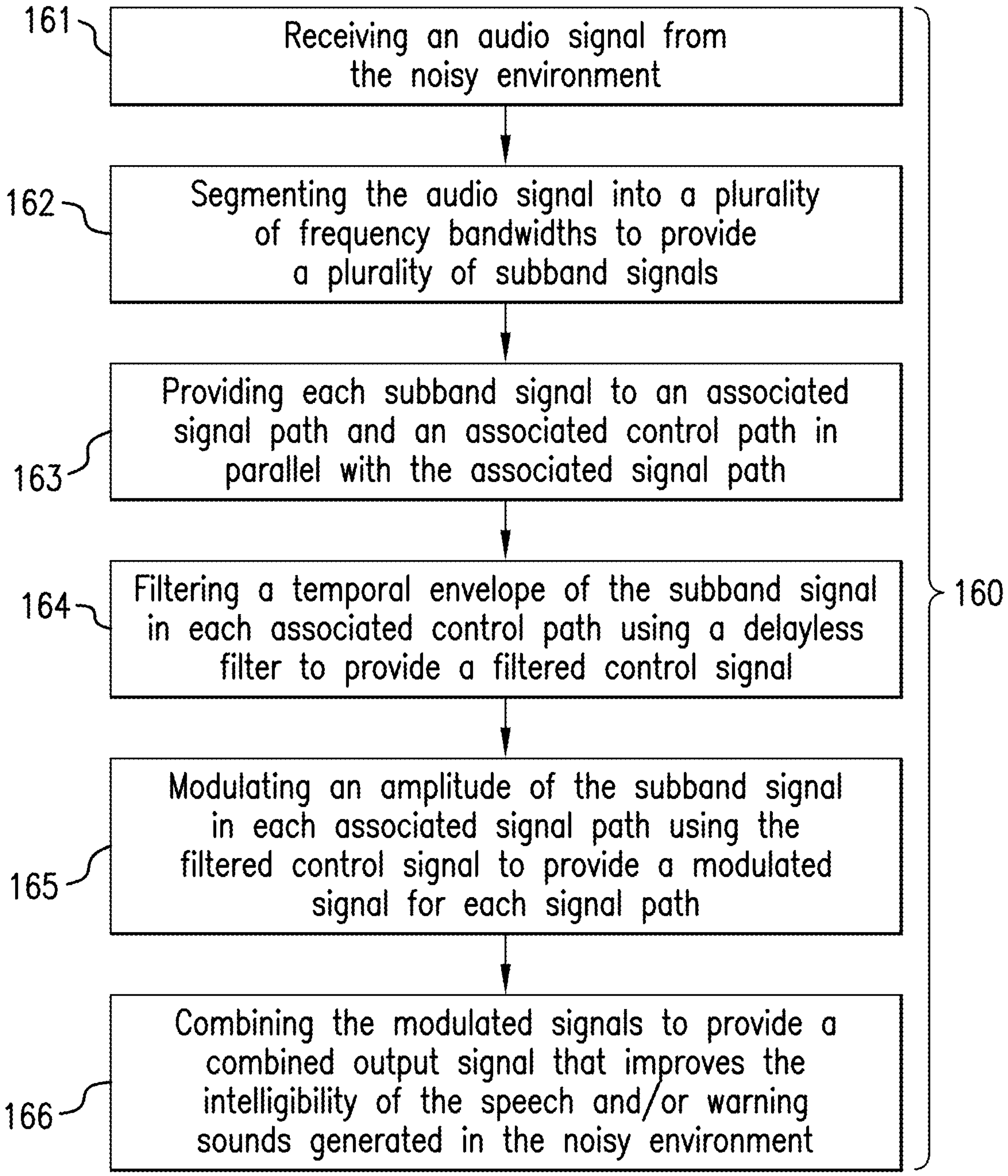
FIG. 16 is a flow chart for a method for improving intelligibility of speech and/or warning sounds generated in a noisy environment.

FIG. 16 is a flow chart for a method for improving intelligibility of speech and/or warning sounds generated in a noisy environment. Block 161 calls for receiving an audio signal from the noisy environment. Block 162 calls for segmenting the audio signal into a plurality of frequency bandwidths to provide a plurality of subband signals. Block 163 calls for providing each subband signal to an associated signal path and an associated control path in parallel with the associated signal path. Block 164 calls for filtering a temporal envelope of the subband signal in each associated control path using a delayless filter to provide a filtered control signal. In one or more embodiments, the filtering includes filtering at modulation frequencies corresponding to peak magnitudes of speech modulations. In one or more embodiments, all filtering is performed with delayless filters. In one or more embodiments, all delayless filters in the associated control path are moving detrend filters. Block 165 calls for modulating an amplitude of the subband signal in each associated signal path using the filtered control signal to provide a modulated signal for each signal path. In one or more embodiments, the modulating can be linear amplitude modulation and/or non-linear amplitude modulation. In one or more embodiments, the modulating can be binary modulation. Block 166 calls for combining the modulated signals to provide a combined output signal that improves the intelligibility of the speech and/or warning sounds generated in the noisy environment. Block 166 may also include converting the combined output signal into an acoustic signal that improves the intelligibility of the speech and/or warning sounds generated in the noisy environment. In the method 160. all signal processing may be performed in the time domain.

Regarding binary modulation noted in the method 160, the binary modulation may be based on a detected magnitude ratio such as a first magnitude ratio, which includes a ratio of the filtered control signal to the subband signal (i.e., unfiltered signal), and/or a second magnitude ratio, which includes a ratio of the filtered control signal to a combination of the subband signal minus the filtered control signal. The method 160 may include equalizing a bandwidth of the subband signal to a bandwidth of the filtered control signal for at least one of the first magnitude ratio or the second magnitude ratio. The method 160 may also include smoothing changes in at least one of the first magnitude ratio or the second magnitude ratio using a low-pass filter. The method 160 may further include smoothing changes in at least one of the first magnitude ratio or the second magnitude ratio using a low-pass filter. In the method 160, the modulating may include modulating by unity in response to at least one of the first magnitude ratio or the second magnitude ratio meeting or exceeding a selected threshold value and modulating by less than unity in response to at least one of the first magnitude ratio or the second magnitude ratio being less than the selected threshold value.

Figure 17:
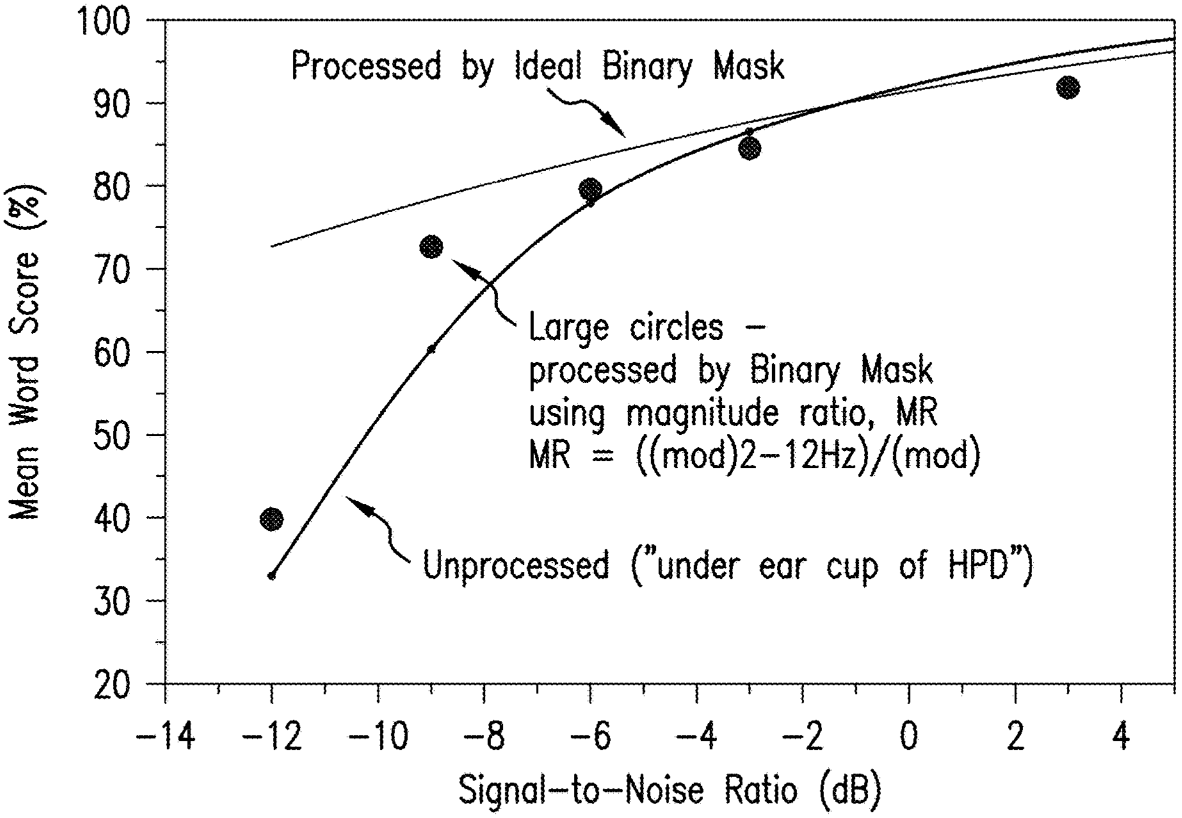
FIG. 17 illustrates a quantitative improvement in intelligibility of received acoustic sounds using the audio processor.

FIG. 17 is presented to illustrate a quantitative improvement in intelligibility of received acoustic sounds using the audio processor 12 at different speech signal-to-noise ratios (SNRs). The improvement in the intelligibility of the received acoustic sounds is indicated by the increases in word scores when the disclosure is used compared to when it is not used by a person "wearing" a simulated hearing protector (large black filled circles compared to small black filled circles). Also shown in FIG. 17 is the maximum increase in word score (i.e., speech intelligibility) that can be obtained in principle by binary masking. This is shown by the thin black line (results obtained by using a so-called ideal binary mask). The algorithm that produced the data plotted as large black filed circles in FIG. 17 is shown in FIG. 14. In FIG. 17, HPD refers to "hearing protection device," which is a passive device without signal processing.

It can be appreciated that the above disclosure provides advantages when integrated into or used in conjunction with several types of devices. In a first example, the methods and apparatuses disclosed herein for increasing the intelligibility of speech and/or certain sounds such as warning sounds can be incorporated into cell phones. In a second example, those methods and apparatuses can be incorporated into communication headsets such as those used by pilots in flying airplanes, by pit crews in automobile races, or by workers in industrial environments. In a third example, those methods and apparatuses can be incorporated into military radios or communication gear to increase intelligibility of speech and/or warning sounds in a noisy field environment such as a combat environment. Please note that the above examples are non-limiting and that the methods are apparatuses disclosed herein can be applied to any other applications requiring improvement in intelligibility of speech and/or warning sounds. Also, please note that hearing protectors can be added for each application of the methods and apparatuses disclosed herein.

Set forth below are some embodiments of the foregoing disclosure:

Embodiment 1: A method for improving intelligibility of speech and/or warning sounds generated in a noisy environment includes receiving an audio signal from the noisy environment, segmenting the audio signal into a plurality of frequency bandwidths to provide a plurality of subband signals, providing each subband signal to an associated signal path and an associated control path in parallel with the associated signal path, filtering a temporal envelope of the subband signal in each associated control path using a delayless filter to provide a filtered control signal, modulating an amplitude of the subband signal in each associated signal path using the filtered control signal to provide a modulated signal for each signal path, combining the modulated signals for each signal path to provide a combined output signal, and converting the combined output signal into an acoustic signal that improves the intelligibility of the speech and/or warning sounds generated in the noisy environment wherein the segmenting, filtering, modulating, combining, and converting are performed in the time domain.

Embodiment 2: The method according to any previous embodiment wherein the plurality of frequency bandwidths are contiguous over a bandwidth of the audio signal.

Embodiment 3: The method according to any previous embodiment wherein processing each subband signal in the associated signal path and in the associated control path for the plurality of subband signals is performed concurrently in multiple parallel subband paths, each subband path comprising the associated signal path and the associated control path for each frequency bandwidth.

Embodiment 4: The method according to any previous embodiment further including applying a separate gain to each modulated signal.

Embodiment 5: The method according to any previous embodiment wherein using the delayless filter includes using a moving detrend filter.

Embodiment 6: The method according to any previous embodiment wherein the filtering includes filtering at modulation frequencies corresponding to peak magnitudes of speech modulations.

Embodiment 7: The method according to any previous embodiment wherein the modulating includes at least one of linear or non-linear amplitude modulation.

Embodiment 8: The method according to any previous embodiment wherein the modulating includes binary modulation.

Embodiment 9: The method according to any previous embodiment wherein a first magnitude ratio comprises a ratio of the filtered control signal to the subband signal and a second magnitude ratio comprises a ratio of the filtered control signal to a combination of the subband signal minus the filtered control signal, the method further including equalizing a bandwidth of the subband signal to a bandwidth of the filtered control signal for at least one of the first magnitude ratio or the second magnitude ratio, and smoothing changes in at least one of the first magnitude ratio or the second magnitude ratio using a low-pass filter, wherein the modulating includes modulating by unity in response to at least one of the first magnitude ratio or the second magnitude ratio meeting or exceeding a selected threshold value and modulating by less than unity in response to at least one of the first magnitude ratio or the second magnitude ratio being less than the selected threshold value.

Embodiment 10: The method according to any previous embodiment further including introducing hysteresis to detecting at least one of the first magnitude ratio or the second magnitude ratio to reduce an effect of fluctuating modulations by slowing a change in binary modulation from at least one of unity to less than unity or less than unity to unity.

Embodiment 11: The method according to any previous embodiment wherein all filtering is performed by delayless filters.

Embodiment 12: An apparatus for improving intelligibility of speech and/or warning sounds generated in a noisy environment, the apparatus including a plurality of bandwidth filters configured to segment an audio signal into a plurality of frequency bandwidths to provide a plurality of subband signals, a signal path and a control path in parallel with the signal path for each subband signal to receive the associated subband signal, a delayless filter disposed in each control path to filter a temporal envelope of the associated subband signal in the control path to provide a filtered control signal, a modulation node in communication with each signal path and control path pair and configured to modulate the subband signal in the signal path with the filtered control signal in the control path to provide a modulated signal for each subband, a summing node configured to sum the modulated signals to provide a combined output signal, and an acoustic transducer that receives the combined output signal and converts the combined output signal into an acoustic signal that improves the intelligibility of the speech and/or warning sounds generated in the noisy environment wherein the apparatus performs signal processing in the time domain.

Embodiment 13: The apparatus according to any previous embodiment, further including a microphone coupled to the plurality of bandwidth filters and configured to receive the audio signal from the noisy environment.

Embodiment 14: The apparatus according to any previous embodiment wherein the plurality of frequency bandwidths are contiguous over a bandwidth of the audio signal.

Embodiment 15: The apparatus according to any previous embodiment wherein a processor implements the plurality of bandwidth filters, the signal path, the control path, the delayless filter disposed in each control path, and the modulation node and wherein the processor processes the plurality of subband signals concurrently.

Embodiment 16: The apparatus according to any previous embodiment, further including a gain block disposed after each modulation node and configured to apply a separate gain to each modulated signal.

Embodiment 17: The apparatus according to any previous embodiment wherein the delayless filter comprises a moving detrend filter.

Embodiment 18: The apparatus according to any previous embodiment wherein the delayless filter filters at modulation frequencies corresponding to peak magnitudes of speech modulations.

Embodiment 19: The apparatus according to any previous embodiment wherein modulation node is configured for at least one of linear or non-linear amplitude modulation.

Embodiment 20: The apparatus according to any previous embodiment wherein the modulation node is configured for binary modulation.

Embodiment 21: The apparatus according to any previous embodiment wherein a first magnitude ratio includes a ratio of the filtered control signal to the subband signal and a second magnitude ratio includes a ratio of the filtered control signal to a combination of the subband signal minus the filtered control signal, the apparatus further including a processor configured to equalize a bandwidth of the subband signal to a bandwidth of the filtered control signal for calculating at least one of the first magnitude ratio or the second magnitude ratio, and a low-pass filter configured to smooth changes in at least one of the first magnitude ratio or the second magnitude ratio wherein the modulation node is configured to modulating by unity in response to at least one of the first magnitude ratio or the second magnitude ratio meeting or exceeding a selected threshold value and to modulate by less than unity in response to at least one of the first magnitude ratio or the second magnitude ratio being less than the selected threshold value.

Embodiment 22: The apparatus according to any previous embodiment, further including a magnitude ratio detector configured to detect at least one of the first magnitude ratio and the second magnitude ratio wherein hysteresis in a detection magnitude reduces an effect of fluctuating modulations on the magnitude ratio detector by slowing a change in binary modulation in the modulation node from at least one of unity to less than unity or less than unity to unity.

Embodiment 23: The apparatus according to any previous embodiment wherein all filters are delayless filters.

Embodiment 24: A non-transient computer-readable medium includes instructions for implementing a method including receiving an audio signal from the noisy environment, segmenting the audio signal into a plurality of frequency bandwidths to provide a plurality of subband signals, providing each subband signal to an associated signal path and an associated control path in parallel with the associated signal path, filtering a temporal envelope of the subband signal in each associated control path using a delayless filter to provide a filtered control signal, modulating an amplitude of the subband signal in each associated signal path using the filtered control signal to provide a modulated signal for each signal path, and combining the modulated signals for each signal path to provide a combined output signal that improves the intelligibility of the speech and/or warning sounds generated in the noisy environment wherein the segmenting, filtering, modulating, and combining are performed in the time domain.

In support of the teachings herein, various analysis components may be used, including a digital and/or an analog system. For example, the audio processor 12 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112 (f) interpretations as "means-plus-function" language unless specifically expressed as such by use of the words "means for" or "steps for" within the respective claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The conjunction "or" when used with a list of at least two terms is intended to mean any term or combination of terms. The conjunction "and/or" when used between two terms is intended to mean both terms or any individual term. The term "configured" relates one or more structural limitations of a device that are required for the device to perform the function or operation for which the device is configured. The terms "first" and "second" and the like are not intended to denote a particular order but rather are intended to distinguish elements. The term "exemplary" is not intended to be construed as a superlative example but merely one of many possible examples.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitations.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for improving intelligibility of speech and/or warning sounds generated in a noisy environment, the method comprising:

receiving an audio signal from the noisy environment;

segmenting the audio signal into a plurality of frequency bandwidths to provide a plurality of subband signals;

providing each subband signal to an associated signal path and an associated control path in parallel with the associated signal path;

filtering a temporal envelope of a subband signal in each associated control path using a delayless filter to provide a filtered control signal;

modulating an amplitude of the subband signal in each associated signal path using the filtered control signal to provide a modulated signal for each signal path;

combining the modulated signals for the each signal path to provide a combined output signal; and converting the combined output signal into an acoustic signal that improves the intelligibility of the speech and/or warning sounds generated in the noisy environment;

wherein the segmenting, filtering, modulating, combining, and converting are performed in a time domain.

2. The method according to claim 1, wherein the plurality of frequency bandwidths are contiguous over a bandwidth of the audio signal.

3. The method according to claim 1, wherein processing the each subband signal in the associated signal path and in the associated control path for the plurality of subband signals is performed concurrently in multiple parallel subband paths, each subband path comprising the associated signal path and the associated control path for each frequency bandwidth.

4. The method according to claim 1, further comprising applying a separate gain to each modulated signal.

5. The method according to claim 1, wherein using the delayless filter comprises using a moving detrend filter.

6. The method according to claim 1, wherein the filtering comprises filtering at modulation frequencies corresponding to peak magnitudes of speech modulations.

7. The method according to claim 1, wherein the modulating comprises at least one of linear or non-linear amplitude modulation.

8. The method according to claim 1, wherein the modulating comprises binary modulation.

9. The method according to claim 8, wherein a first magnitude ratio comprises a ratio of the filtered control signal to the subband signal and a second magnitude ratio comprises a ratio of the filtered control signal to a combination of the subband signal minus the filtered control signal, the method further comprising:

equalizing a bandwidth of the subband signal to a bandwidth of the filtered control signal for at least one of the first magnitude ratio or the second magnitude ratio; and smoothing changes in at least one of the first magnitude ratio or the second magnitude ratio using a low-pass filter;

wherein the modulating comprises modulating by unity in response to at least one of the first magnitude ratio or the second magnitude ratio meeting or exceeding a selected threshold value and modulating by less than unity in response to at least one of the first magnitude ratio or the second magnitude ratio being less than the selected threshold value.

10. The method according to claim 9, further comprising introducing hysteresis to detecting at least one of the first magnitude ratio or the second magnitude ratio to reduce an effect of fluctuating modulations by slowing a change in binary modulation from at least one of unity to less than unity or less than unity to unity.

11. The method according to claim 1, wherein all filtering is performed by delayless filters.

12. An apparatus for improving intelligibility of speech and/or warning sounds generated in a noisy environment, the apparatus comprising:

a plurality of bandwidth filters configured to segment an audio signal into a plurality of frequency bandwidths to provide a plurality of subband signals;

a signal path and a control path in parallel with the signal path for each subband signal to receive an associated subband signal;

a delayless filter disposed in each control path to filter a temporal envelope of the associated subband signal in the control path to provide a filtered control signal;

a modulation node in communication with each signal path and control path pair and configured to modulate the associated subband signal in the signal path with the filtered control signal in the control path to provide a modulated signal for each subband;

a summing node configured to sum modulated signals to provide a combined output signal; and an acoustic transducer that receives the combined output signal and converts the combined output signal into an acoustic signal that improves the intelligibility of the speech and/or warning sounds generated in the noisy environment;

wherein the apparatus performs signal processing in the time domain.

13. The apparatus according to claim 12, further comprising a microphone coupled to the plurality of bandwidth filters and configured to receive the audio signal from the noisy environment.

14. The apparatus according to claim 12, wherein the plurality of frequency bandwidths are contiguous over a bandwidth of the audio signal.

15. The apparatus according to claim 12, wherein a processor implements the plurality of bandwidth filters, the signal path, the control path, the delayless filter disposed in each control path, and the modulation node and wherein the processor processes the plurality of subband signals concurrently.

16. The apparatus according to claim 12, further comprising a gain block disposed after each modulation node and configured to apply a separate gain to each modulated signal.

17. The apparatus according to claim 12, wherein the delayless filter comprises a moving detrend filter.

18. The apparatus according to claim 12, wherein the delayless filter filters at modulation frequencies corresponding to peak magnitudes of speech modulations.

19. The apparatus according to claim 12, wherein modulation node is configured for at least one of linear or non-linear amplitude modulation.

20. The apparatus according to claim 12, wherein the modulation node is configured for binary modulation.

21. The apparatus according to claim 20, wherein a first magnitude ratio comprises a ratio of the filtered control signal to the associated subband signal and a second magnitude ratio comprises a ratio of the filtered control signal to a combination of the associated subband signal minus the filtered control signal, the apparatus further comprising:

a processor configured to equalize a bandwidth of the associated subband signal to a bandwidth of the filtered control signal for calculating at least one of the first magnitude ratio or the second magnitude ratio; and a low-pass filter configured to smooth changes in at least one of the first magnitude ratio or the second magnitude ratio;

wherein the modulation node is configured to modulating by unity in response to at least one of the first magnitude ratio or the second magnitude ratio meeting or exceeding a selected threshold value and to modulate by less than unity in response to at least one of the first magnitude ratio or the second magnitude ratio being less than the selected threshold value.

22. The apparatus according to claim 21, further comprising a magnitude ratio detector configured to detect at least one of the first magnitude ratio and the second magnitude ratio wherein hysteresis in a detection magnitude reduces an effect of fluctuating modulations on the magnitude ratio detector by slowing a change in binary modulation in the modulation node from at least one of unity to less than unity or less than unity to unity.

23. The apparatus according to claim 22, wherein all filters are delayless filters.

24. A non-transitory computer-readable medium comprising instructions for implementing a method comprising:

receiving an audio signal from a noisy environment;

segmenting the audio signal into a plurality of frequency bandwidths to provide a plurality of subband signals;

providing each subband signal to an associated signal path and an associated control path in parallel with the associated signal path;

filtering a temporal envelope of a subband signal in each associated control path using a delayless filter to provide a filtered control signal;

modulating an amplitude of the subband signal in each associated signal path using the filtered control signal to provide a modulated signal for each signal path; and combining modulated signals for each signal path to provide a combined output signal that improves intelligibility of the speech and/or warning sounds generated in the noisy environment;

wherein the segmenting, filtering, modulating, and combining are performed in a time domain.

* * * * *